(12) United States Patent
Ben-Elazar et al.

(10) Patent No.: US 12,475,520 B2
(45) Date of Patent: Nov. 18, 2025

(54) AUTOMATED GENERATION OF PREDICTIVE INSIGHTS CLASSIFYING USER ACTIVITY

(71) Applicant: Microsoft Technology Licensing, LLC, Redmond, WA (US)

(72) Inventors: Shay Ben-Elazar, Herzliya (IL); Daniel Sitton, Tel Aviv (IL); Amnon Catav, Tel Aviv (IL); Yossef Hai Ben David, Tel Aviv (IL); Yair Zohav Zagdanski, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 976 days.

(21) Appl. No.: 17/403,069

(22) Filed: Aug. 16, 2021

(65) Prior Publication Data
US 2023/0050034 A1    Feb. 16, 2023

(51) Int. Cl.
*G06N 20/00* (2019.01)
*G06Q 50/20* (2012.01)

(52) U.S. Cl.
CPC ........... *G06Q 50/205* (2013.01); *G06N 20/00* (2019.01)

(58) Field of Classification Search
CPC .................................................. G06Q 50/205
See application file for complete search history.

(56) References Cited

U.S. PATENT DOCUMENTS

| | | |
|---|---|---|
| 2010/0190142 A1 | 7/2010 | Gal et al. |
| 2015/0089399 A1 | 3/2015 | Megill et al. |
| 2017/0004722 A1 | 1/2017 | Dragos |
| 2018/0247549 A1 | 8/2018 | Martin et al. |

(Continued)

FOREIGN PATENT DOCUMENTS

WO    2014127241 A1    8/2014

OTHER PUBLICATIONS

Yang, Stephen JH, et al. "Predicting students' academic performance using multiple linear regression and principal component analysis." Journal of Information Processing 26 (2018): 170-176. (Year: 2018).*

(Continued)

*Primary Examiner* — Hal Schnee

(57) ABSTRACT

Non-limiting examples of the present disclosure relate to application of artificial intelligence (AI) processing to generate classifications of user activity for a group of users. For example, a classification prediction is generated indicating whether students in an educational class are predicted, over a predetermined time period, to have a high or low activity level based on contextual analysis of multiple types of user-driven events. As user activity data is typically quite robust, the present disclosure applies dimensionality reduction processing to efficiently manage user activity data and further improve accuracy in generating downstream binary classifications. A dimensionality reduction transformation of user activity data results in a low-dimensional representation of input feature data that is contextually relevant for generating a binary classification. Derived classifications are then (Continued)

utilized to generate data insights pertaining to user activity levels of one or more users. Data insights are can then be rendered for presentation.

18 Claims, 7 Drawing Sheets

(56) References Cited

U.S. PATENT DOCUMENTS

| | | | |
|---|---|---|---|
| 2019/0164082 A1 | 5/2019 | Wu | |
| 2020/0045119 A1 | 2/2020 | Weldemariam et al. | |
| 2020/0135045 A1* | 4/2020 | Alyuz Civitci | G06V 40/171 |
| 2020/0211035 A1* | 7/2020 | Bluming | G06Q 10/0635 |
| 2022/0319181 A1* | 10/2022 | Kanuganti | G09B 7/02 |

OTHER PUBLICATIONS

Hussain, Mushtaq, et al. "Student Engagement Predictions in an e-Learning System and Their Impact on Student Course Assessment Scores." Computational intelligence and neuroscience 2018.1 (2018): 6347186. (Year: 2018).*

Asghar, Muhammad Zubair, et al. "Fuzzy-based sentiment analysis system for analyzing student feedback and satisfaction." (2019). (Year: 2019).*

Ramesh, Arti, et al. "Learning latent engagement patterns of students in online courses." Proceedings of the AAAI Conference on Artificial Intelligence. vol. 28. No. 1. 2014. (Year: 2014).*

Borges, et al., "Using Principal Component Analysis to Support Students' Performance", In Conference of Brazilian Symposium on Computers in Education (Simpósio Brasileiro de Informática na Educação-SBIE), vol. 29, Issue 1, Oct. 2018, pp. 1383-1392.

Hershcovits, et al., "Modeling Engagement in Self-Directed Learning Systems Using Principal Component Analysis", In Journal of IEEE Transactions on Learning Technologies, vol. 13, Issue 1, Jan. 2020, pp. 164-171.

Twenefour, et al., "Principal Component Analysis of Students Academic Performance", In International Journal of Business and Social Research, vol. 05, Issue 02, Feb. 18, 2015, pp. 42-54.

"International Search Report and Written Opinion Issued in PCT Application No. PCT/US22/037233", Mailed Date: Nov. 2, 2022, 11 Pages.

Wei, et al., "Study on Learning Effect Prediction Models based on Principal Component Analysis in MOOCs", In Journal Cluster Computing, vol. 22, Issue 6, Apr. 10, 2018, pp. 15347-15356.

* cited by examiner

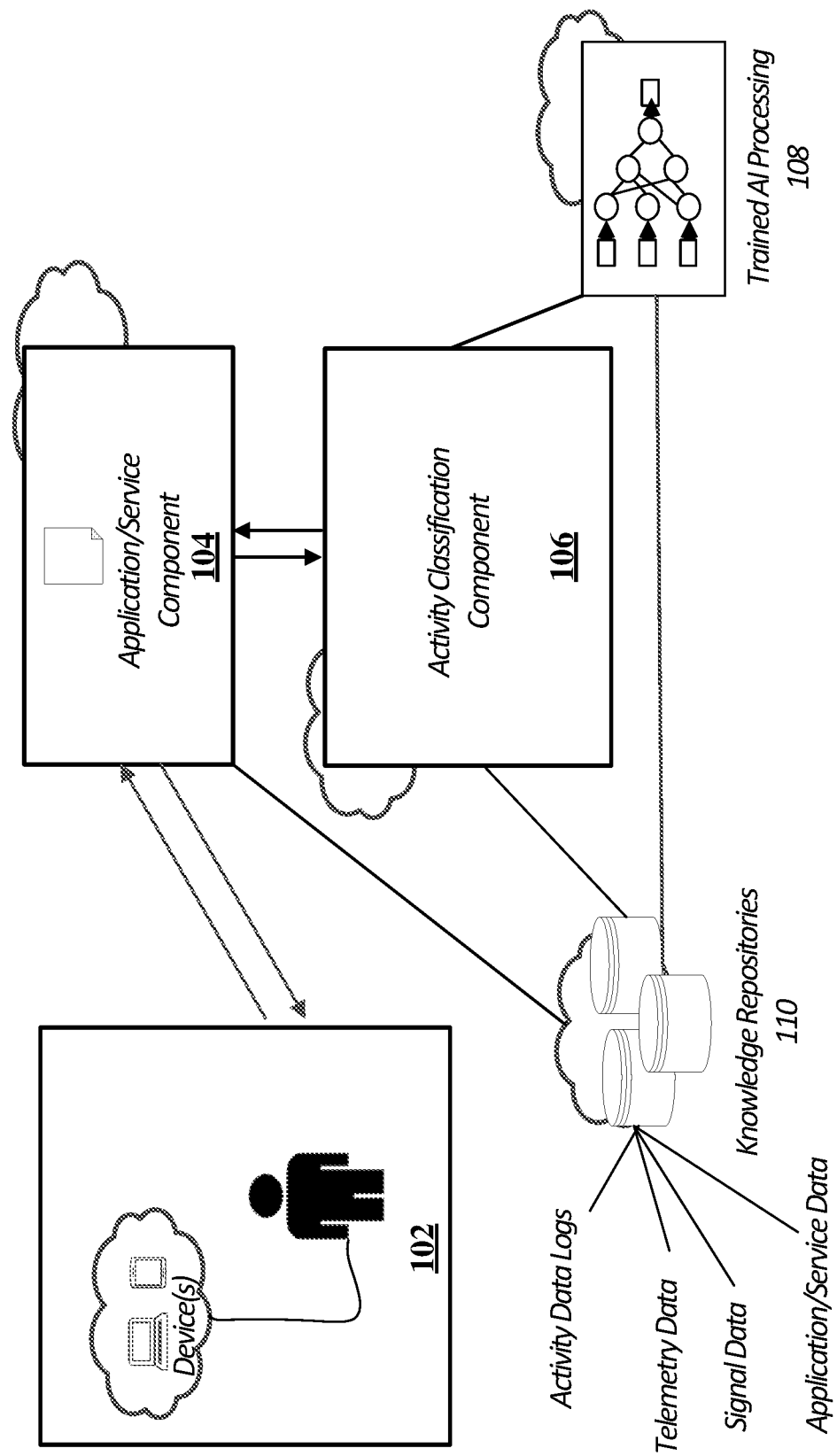

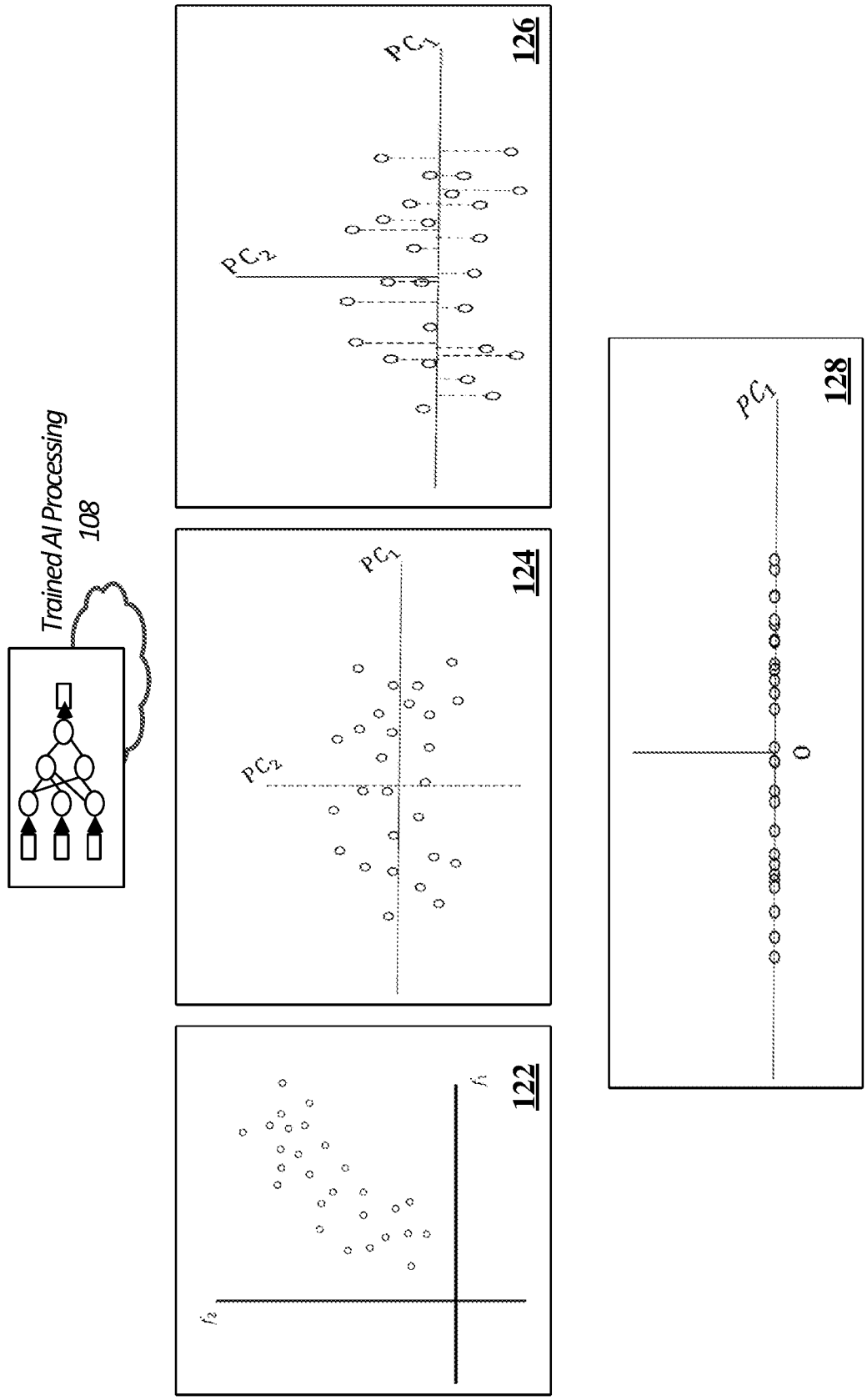

All Teams

Activity
Chat
Teams
Calendar
Calls
Files

English 101

General  Posts  Files  Class Notebook  Assignments  Grades  +

DIGITAL ENGAGEMENT

302
8  Students are
Less active this week
304

306
6  Students are predicted to be more active next week

Automatic Insight Notification:

During the last SharePoint® assignment (wee[k]) was 20 percent more active at the same [time] relative to the assignment due d[ate]

During this week, the activity average for oth[er students in] the Class (English 101) is 15 percent higher tha[n the] average of Shay Daniel. 32[0]

Shay Daniel responded negatively to the wee[kly] emotional survey for the current assignmen[t]

See More 330

Weekly Emotional Survey Results (Week 3) — 342

Shay Daniel provided a confused emoji in response to a question 344 about the report guidelines Other Student(s) who provided a confused emoji in response to the same question: 346

Yossi Yair Amnon

348 Follow-up with Yossi Yair Amnon

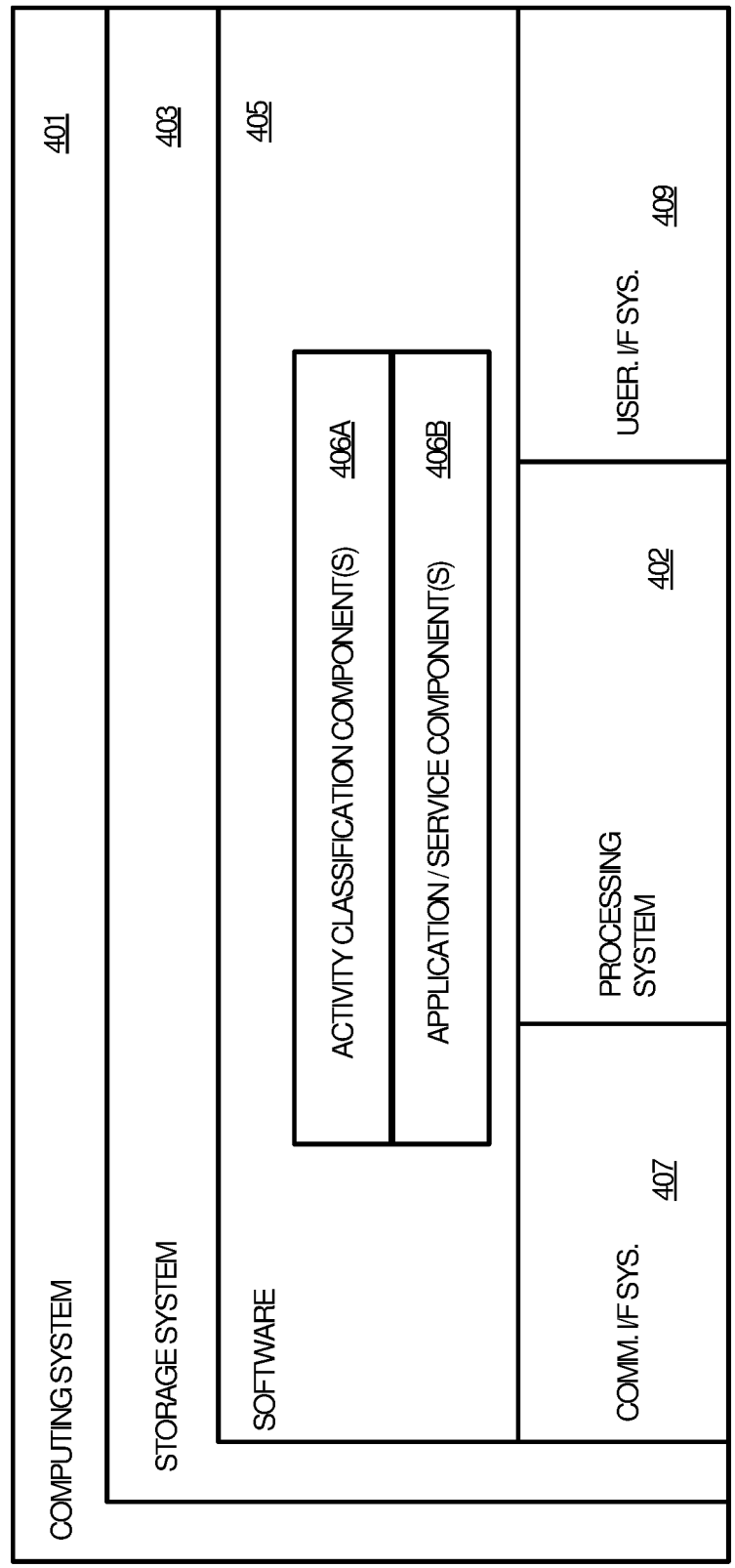

AUTOMATED GENERATION OF PREDICTIVE INSIGHTS CLASSIFYING USER ACTIVITY

BACKGROUND

Aggregating multi-dimensional activity data to generate a binary classification about a user is not trivial. Typically, previous solutions use simple heuristics (e.g., a majority vote heuristic) as a means of classifying user activity. However, such approaches can over-count correlated events because heuristic analysis is not robust enough to contextually consider events with different activity scales. This typically leads to generation of result that are biased. When working with a variety of different types of activity data, biased modeling can result in inaccurate classifications, among other technical issues.

Additional technical challenges exist when you consider that activity data collected from a robust software platform comprises events data aggregated across a plurality of applications or services. As user activity can vary across different applications/services at any interval (e.g., on a week to week basis), it can be difficult to use patterns of past user activity to always provide accurate real-time predictions of user activity. Variance in content and tasks often vary and need to be properly framed to generate accurate predictions of user activity.

Yet another technical challenge stems from understanding how to generate data insights from activity data, especially that which pertains to user engagement with online learning tools. Activity data is often voluminous and weakly correlated, making it extremely difficult to generate meaningful data insights. Processing of such a large amount of weakly correlated data requires significant computational resources, which would further need to be programmed for that specific purpose of data insight generation. Challenges further arise when considering processing efficiency and latency issues, where results often need to be generated in real-time (or near real-time) to be effective. This is especially true when trying to generate predictive notifications such as those that are used to aid educational progress. For example, traditional evaluation of e-learning activity offers a partial/sparse view of a student's overall learning activity. This makes it difficult generate contextually relevant predictive insights for students and further frame insights in a way that other users (e.g., teachers, parents) can understand why a prediction is made.

SUMMARY

For resolution of the above identified technical problems, as well as other reasons, there is a technical need for application of artificial intelligence (AI) processing to generate classifications of user activity for a group of users. For example, a classification prediction is generated indicating whether students in an educational class are predicted, over a predetermined time period, to have a low or high activity level based on contextual analysis of multiple types of user-driven events. As user activity data is typically quite robust, the present disclosure applies dimensionality reduction processing to efficiently manage user activity data and further improve accuracy in generating downstream binary classifications. A dimensionality reduction transformation of user activity data results in a low-dimensional representation of input feature data that is contextually relevant for generating a binary classification over a predetermined time period. Derived classifications are then utilized to generate data insights pertaining to user activity levels of one or more users. Data insights can then be rendered for display, for example, via an application/service of a domain-specific software data platform.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1A illustrates an exemplary system diagram of components interfacing to enable automatic generation of classifications of levels of user activity pertaining to usage of a system or service, with which aspects of the present disclosure may be practiced.

FIG. 1B illustrates an exemplary process flow for improving generation of classifications of levels of user activity via execution of dimensionality reduction processing, with which aspects of the present disclosure may be practiced.

FIGS. 3A-3C illustrate exemplary processing device views associated with user interface examples for an improved user interface that is adapted for management of data insights providing classification of levels of user activity with a system or service, with which aspects of the present disclosure may be practiced.

FIG. 4 illustrates a computing system suitable for implementing processing operations described herein related to generation and management of classifications of levels of user activity, with which aspects of the present disclosure may be practiced.

DETAILED DESCRIPTION

Figure 2:
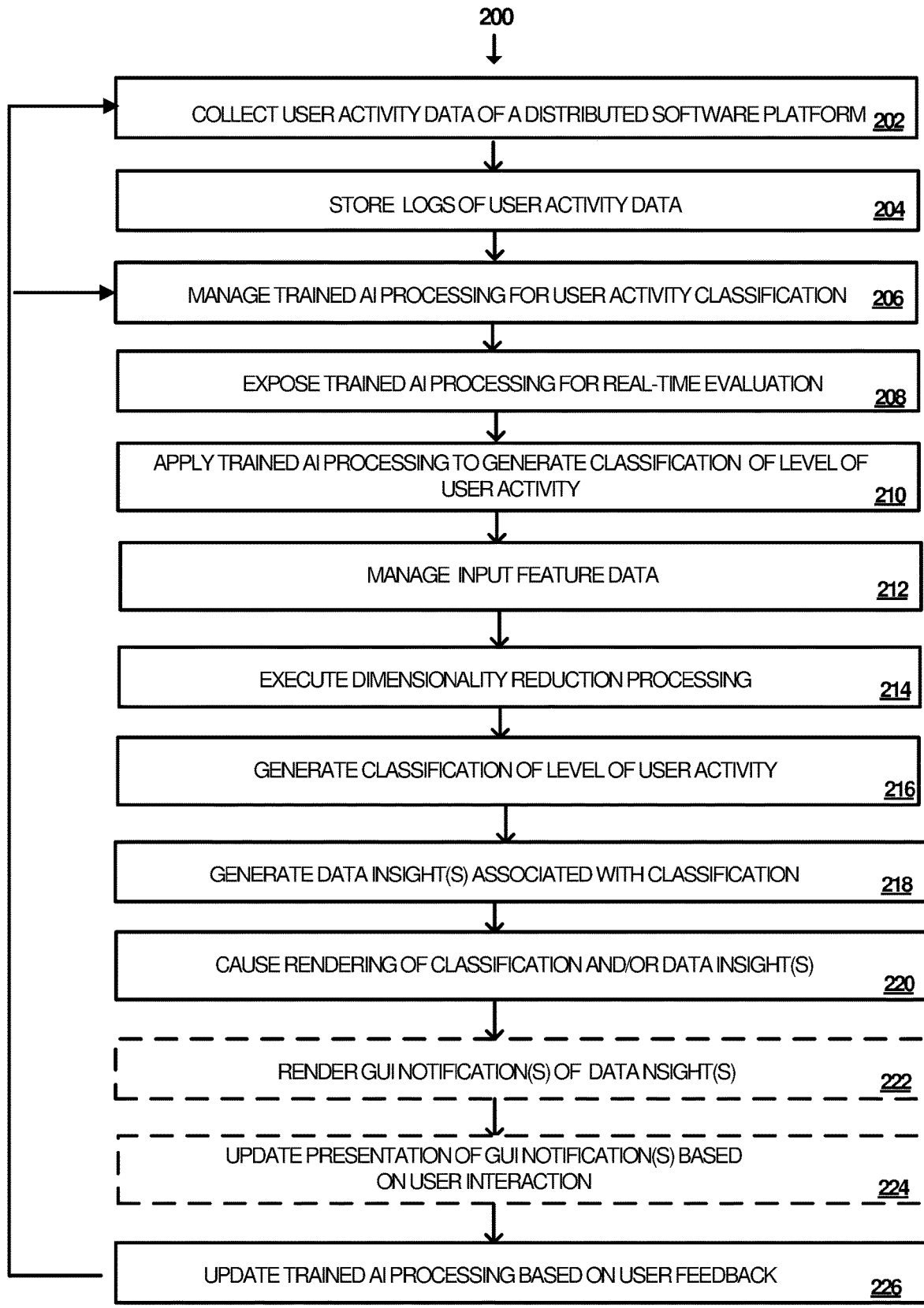
FIG. 2 illustrates exemplary method related to automatic generation of classification of levels of user activity, with which aspects of the present disclosure may be practiced.

The present disclosure relates to application of AI processing that is adapted to generate classifications of user activity for a group of users. For example, a classification prediction is generated indicating whether students in an educational class are predicted, over a predetermined time period, to have a low or high activity level based on contextual analysis of multiple types of user-driven events. As user activity data is typically quite robust, the present disclosure applies dimensionality reduction processing to efficiently manage user activity data and further improve accuracy in generating downstream binary classifications. A dimensionality reduction transformation of user activity data results in a low-dimensional representation of input feature data that is contextually relevant for generating a binary classification over a predetermined time period. Derived classifications are then utilized to generate data insights pertaining to user activity levels of one or more users. Data insights can then be rendered for display, for example, via an application/service of a domain-specific software data platform.

For ease of understanding and explanation, the present disclosure referenced education as an exemplary domain.

However, it is to be recognized that processing of the present disclosure is adaptable to derive binary classifications for any type of domain. Continuing with education as an example domain, user activity data is accessed pertaining to user interactions by a plurality of users with an educational software platform. An educational software platform is a non-limiting example of a distributed software platform. A distributed software platform is a software system connecting components thereof over a distributed network connection. Implement of components to enable operation of components of a software data platform over a network connection are known to one skilled in the field of art. For instance, a distributed software platform may be backed by one or more services to enable the distributed software platform to be implemented in a variety of technical distributed data scenarios including but not limited to: software as a service (SaaS); platform as a service (PaaS); communication platform as a service (CPaaS); and infrastructure as a service (IaaS), among other examples. Moreover, the distributed software platform may support many different programming languages, tools, and frameworks, etc., including both organizationally proprietary systems (e.g., MICROSOFT®-specific) and third-party software and systems including those of independent software vendors. As such, users of a distributed software platform (e.g., educational software platform) create user activity data by interacting with a plurality of application/services adapted for a specific domain (e.g., education).

Continuing with an education example, an educational software platform enables students, teachers, administrators, parents, etc., to be connected through customized versions of software products that helps guide learning (online, in-person and/or hybrid learning) and management of associated educational data. Integration of educational platforms provide online learning resources and implementation of the same is known to one skilled in the field of art. As a point of reference, capabilities of an educational platform comprise but are not limited to: registering students in courses; conducting online learning/classes; document storage, retention and management; assignment/document submission and grading, transcript management, student assessment evaluation; management of access to content provided for learning; building student schedules; tracking student attendance; managing data for extracurricular activities; user feedback (including student-specific surveys); and managing student-related data needs in a school, among other examples. One example of a well-known distributed software platform is MICROSOFT365®, which may be tailored for management of a specific document (e.g., education). In an educational domain example, applications/services of a distributed software platform (e.g., MICROSOFT365®) are tailored to further educational experiences for users. For instance, an online classroom and resources for management of associated users, content, etc., are enabled through MICROSOFT® Education thereby providing an online learning (or hybrid learning) environment.

In one non-limiting example, user activity data of distributed software platform (e.g., educational software platform) is accessed. Exemplary user activity data pertains to user interactions, by a plurality of users (e.g., student users) with each of a plurality of application and/or services associated with a distributed software platform. In an educational example, user activity data pertains to user interactions by student users with applications/services associated with applications/services of an educational software platform. For instance, user activity data comprises event count data indicating a count or rate of user interactions with specific application/services of an educational software platform and/or specific features of associated applications/services. As there are a plurality of student users to consider, a plurality of applications/services associated with an educational software platform and an even greater number of individual features to consider access to, a dataset of counts of user activity data for a plurality of student users is very robust.

In further examples, user activity data is further made even more robust by the inclusion of additional data types. As an example, user activity data may comprise categorical representations of user feedback received from users of the educational software platform. For instance, user feedback may be received through one or more applications/services associated with an educational software platform. For instance, categorical representations of student surveys, provided through educational software platform, are collected to represent social and emotional state of student users at a specific point of reference. In another example, categorical representations may be generated relative to one or more of: prior classification determinations (e.g., previous classifications of levels of user activity); historical user activity data for one or more users; and/or generated data insights (e.g., pertaining to past user activity predictions). An exemplary point of reference may pertain to a predetermined period of time and/or be determined relative to an event (e.g., assignment, exam, progress report, etc.) occurring through the educational software platform. In even further examples, user activity data may comprise categorical representations of prior classifications of user activity of user (e.g., over a historical period of time) and/or categorical representations of data insights associated with a user/group of users (e.g., binary determinations derived from analysis of previously generated data insights). Such data types can further provide context for user activity with an educational software platform as well as provide talking points to follow-up with a student user, parent, teacher, etc., regarding a classification of a level of user activity.

Robustness of user activity data can further require determination of a frame of reference for evaluating the user activity data. With respect to an educational software platform, a plurality of student users may span many geographical locations, schools, school districts, grades, etc. As such, the present disclosure manages user activity data according to an educational frame of reference designation and/or a temporal frame of reference (e.g., predetermined period of time). These levels of curation are applied to identify a group of users that are closely correlated and further identify a contextual framing of the user activity data for the group of users. An educational frame of reference designation identifies a specific educational segmentation that corresponds with one or more student users (e.g., a group of users). In one example, an educational frame of reference designation is an educational class that comprises a plurality of student users, where user activity data of the plurality of student users of the educational class are evaluated. However, it is to be recognized that an educational frame of reference designation can be any type of educational segmentation of users including but not limited to: educational classes; schools; school districts; grade levels; user descriptors (e.g., age) and geographical descriptors, among other examples. Additionally, or in lieu of applying an educational frame of reference designation, user activity data can be curated according to a temporal frame of reference (e.g., predetermined period of time). A temporal frame of reference is an identified period of time for which to generate a predictive classification pertaining to a user activity level of one or more users (e.g., associated with an educational frame of reference designation). In one example, a temporal frame of reference is one week, where a predictive classification of a user activity level is to be generated for student users associated with an educational class for a given week (e.g., one week period). It is to be recognized that non-limiting examples of temporal frame of reference comprise any period of time including but not limited to: days; weeks; months; and years, among other examples. In technical instances where other types of domain-specific software platforms are being evaluated, specific references as to data types of user activity data and reference designations may be adapted for a specific domain.

Once user activity data accessed and properly framed, the present disclosure proceeds to apply trained AI processing (one or more trained AI models), which is adapted to generate a classification of a level of user activity for each of the plurality of student users. As referenced above, user activity data is robust. That statement holds true even in instances where levels of curation are applied to frame user activity data for classification processing. As such, dimensionality reduction processing is executed on input feature data pertaining to user activity data. Dimensionality reduction processing is the transformation of data from a high-dimensional space into a low-dimensional space so that a low-dimensional representation retains some meaningful properties of the original data. Methods/algorithms for execution of dimensionality reduction processing and associated processing operations thereof that are used to apply dimensionality reduction processing are known to one skilled in the field of art. For reference, non-limiting examples of dimensionality reduction processing comprise but are not limited to: principal component analysis (PCA) both linear and/or non-linear); factor analysis; missing value ratio; low variance filtering; high correlation filtering; decision trees (e.g., random forest); feature selection; feature elimination; factor analysis; linear discriminative analysis (LDA); generalized discriminative analysis (GDA); encoders; and transformers, among other examples.

Above what is traditionally known, trained AI processing is adapted to execute dimensionality reduction processing using user activity data associated with a domain-specific software data platform (e.g., an educational software platform). In one example, dimensionality reduction processing comprises application of a PCA algorithm that is adapted to work with user activity data of an educational software platform to aid classification of levels of user activity for student users. For instance, student users are described as vectors of multiple event count data (e.g., event count data pertaining to exemplary user activity data) and/or exemplary categorical representations described herein, where user activity data is normalized (or standardized) to a relevant frame of reference (e.g., educational frame of reference designation and/or temporal frame of reference). As user activity, assignments, etc., may regularly vary (e.g., week to week) for a specific educational class, some types of event count data may be more relevant than other types of event count data over a temporal frame of reference. As such, executing dimensionality reduction processing can determine variance between different types of user activity data to identify patterns in user activity (corresponding with a frame of reference) based on correlations that are identified between input feature data. This type of analysis improves efficiency for downstream processing by efficiently reducing a dataset while focusing attention on specific types of data correlations that are most useful for classification of levels of user activity of student users (e.g., according to an applied frame of reference). In the present disclosure, trained AI processing is adapted to generate a classification of a level of user activity for each of the plurality of student users based on analysis of a dimensionality reduction transformation of the user activity data. A dimensionality reduction transformation of user activity is a dataset derived from the input feature data (e.g., user activity data) that is projected onto a lower-dimensional feature subspace. In other words, a dimensionality reduction transformation of the user activity data identifies a low-dimension set of axes to summarize the input feature data, where classification processing can then be applied to generate exemplary classifications of levels of user activity for users.

In one example, a PCA algorithm is applied that executes either linear PCA analysis or non-linear PCA analysis. In either technical instance, an exemplary PCA algorithm executes unsupervised learning and analysis on input feature data user activity data). For instance, exemplary dimensionality reduction processing of the present disclosure applies a linear PCA algorithm to generate a dimensionality reduction transformation of the user activity data. A classification algorithm is then applied to evaluate a linear mapping of projected feature data in a PCA space. PCA performs a linear mapping of input data to a lower-dimensional space in such a way that the variance of the data in the low-dimensional representation is maximized. In doing so, a covariance matrix (and in some cases correlation matrix) of the input data is constructed, and the eigenvectors and eigenvalues on said matrix are computed. Computed eigenvectors and eigenvalues of a covariance (or correlation) matrix represent a core part of PCA. Determined eigenvectors correlate to principal components of a PCA space and determine the directions of the new PCA space. The corresponding eigenvalues determine the magnitude of the corresponding eigenvectors. That is, computed eigenvectors represent a new set of axes of the PCA space, and the eigenvalues carry the information of quantity of variance that each eigenvector possesses within that PCA space. In order to reduce the dimension of the initial dataset, eigenvectors that have the most variance are chosen and those with less variance are discarded. As such, a lower-dimensional representation of original input feature data can be mapped in a PCA space according to one or more principal components. The chosen eigenvectors, corresponding with one or more principal components, are then used to reconstruct a large fraction of the variance of the original input data. In practice, a subset of one or more eigenvectors can often be interpreted in terms of the large-scale physical behavior of the system because said eigenvectors often contribute the vast majority of the system's energy, especially in low-dimensional systems. The result is a lower-dimensional data set with some data loss but retaining the most important variance to the space (e.g., spanned by a subset of one or more eigenvectors).

As identified above, an output of PCA algorithm is one or more principal components, the number of which is less than or equal to the number of original variables/features. In most examples, the number of principal components is often less than the number or original variables/features to reduce the dimensionality while maximizing the variance. In one example of the present disclosure, a single principal component is selected. However, in additional examples, two or more principal components are selected as a result of dimensionality reduction processing. A principal component can be defined as a linear combination of optimally-weighted observed variables or features. Principal component are essentially linear combinations of the original variables/features, assigning a weighing to features and variables. Different weights of variables/features are assigned to indicate the importance of each feature. By applying PCA each time a classification is to be generated, a classification of user activity is completely data drive and lends itself to natural interpretation and support of weighing event types by importance according to a domain that is being evaluated. In the case of an educational domain, real-time (or near real-time) PCA analysis is applied to learns how students vary for a given assignment and/or period of time and finds weights to look at importance at each input variable/feature. Furthermore, the present disclosure enhances this analysis by applying an exemplary educational frame of reference designation and/or temporal frame of reference. PCA analysis executed herein can learn how a class of students (or an alternative educational frame of reference designation) varies for a given assignment and/or period of time. User activity across application/services and/or features of an educational software platform may be more important one week to an overall classification of a user activity level (e.g., as high or low), where dimensionality reduction processing helps identify what features are most important to the classification determination relative to frame of reference(s). Moreover, input feature data can be normalized (or standardized) to a class average for an educational frame of reference designation to further enhance classification determinations.

In generating the classification of user activity for each of the plurality of student users, trained AI processing (e.g., one or more trained AI models) executes processing operations that comprise identifying input feature data for the trained AI processing. Exemplary input feature data comprises features indicating the event count data for each of the plurality of student users and/or exemplary categorical representations previously referenced. One non-limiting example of data pertaining to a categorical representation comprises categorical representations of user feedback received through one or more applications/services associated with an educational software platform. For instance, user feedback may be provided through student surveys accessed and completed via applications/services of an educational software platform. In another example, categorical representations may be generated relative to one or more of: prior classification determinations (e.g., previous classifications of levels of user activity); historical user activity data for one or more users; and/or generated data insights (e.g., pertaining to past user activity predictions).

Trained AI processing further executes processing operations to scale input feature data pertaining to exemplary user activity data. In one example, feature scaling processing comprises execution of processing operations that normalize input feature data pertaining to exemplary user activity data. In another technical instance, feature scaling processing comprises executing standardization processing operations on the input feature data. In one example, the input feature data based is normalized (or standardized) based on one or more frame of references (e.g., an educational frame of reference designation and/or temporal frame of reference). Additional processing may be executed to minimize bias when analyzing user activity data. For instance, user activity data, for a plurality of student users associated with an educational class is identified and scrubbed to remove student user identification (e.g., user identification). Scrubbing input feature data to remove user identification helps minimize bias when analyzing the user activity data.

Trained AI processing further executes dimensionality reduction processing on normalized (or standardized) input feature data to generate the dimensionality reduction transformation of the user activity data. In one example, execution of the dimensionality reduction processing comprises executing PCA (e.g., via application of a PCA algorithm) on the normalized (or standardized) input feature data to generate one or more principal components for generating the dimensionality reduction transformation of the user activity data. Once one or more principal components are identified, dimensionality reduction processing further comprises generating, in a PCA space using one or more selected principal components, a lower-dimensional representation of original input feature data (e.g., dimensionality reduction transformation of the user activity data) is generated. A result may be a linear representation of the dimensionality reduction transformation, which is projected in the PCA space according to application of the one or more principal components. Data vectors presented in the PCA space are associated with each of the plurality of student users (e.g., of the educational class), where an activity score, representing an aggregate score from a weighted analysis of user activity data, is generated for each of a plurality of users (e.g., student users).

Furthermore, it is important to execute additional processing to understand the direction of the data being view in the PCA space. In one example, trained AI processing of the present disclosure is adapted to apply a null activity vector (zero values for variables/features of user activity data), along with other vectors, to the PCA space to determine frame of reference for evaluating the dimensionality reduction transformation of the user activity data within the PCA space. In other words, the null vector is projected in the PCA space to help figure out the directional representation of data vectors (e.g., activity scores) in the PCA space, where it is determined whether data vectors are projected in the correct direction. Processing operations are then executed to evaluate a sign (positive or negative) associated with data vectors in an updated PCA space that comprises projected data vectors (e.g., student user vectors) and a null activity vector. In technical instances where a sign associated with projected data vectors (e.g., student user vectors) is positive, a confirmation occurs that data is mapped correctly. In technical instances where a sign associated with projected data vectors is negative, additional processing is executed to update a sign associated with a resulting value. For example, a processing operation is executed to flip a negative sign to a positive sign. Updated values may then be re-projected in a PCA space so that the data is viewable in the proper direction.

Once results are properly projected in a PCA space, trained AI processing is further adapted to analyze results associated with the dimensionality reduction transformation that is projected in a PCA space to generate labels representative of the classification of the level of user activity for each of the plurality of student users. Exemplary labels are a representation of compression of a plurality of dimensions of user activity data into a binary classification for a user. With respect to labeling, trained AI processing applies a classification algorithm to analyze results of graphing user activity data (e.g., projected in a PCA space). Trained AI processing (e.g., a hybrid machine learning model) generates an activity score for each of the plurality of student users. As indicated in the foregoing an activity score represents an aggregate score from a weighted analysis of user activity data, is generated for each of a plurality of users (e.g., student users). Activity scores for a plurality of users are provided as a linear representation for further analysis. For example, a classification algorithm is applied to evaluate the dimensionality reduction transformation of the user activity data. The classification algorithm executes a supervised analysis (e.g., trained AI model) that generates a label indicating a classification of a level of user activity for a user (e.g., student user). In one example, the classification algorithm generates the classification using a classifier trained as a logistic regression model. In another examples, the classification algorithm generates a classification using a linear regression model. Processing for executing analysis of data using a logistic regression model and/or linear regression model are known to one skilled in the field of art.

Above what is traditionally known, the present disclosure applies a logistic regression model or linear regression model (collectively referenced herein as a "classification model") to specifically analyze exemplary user activity data, where the classification model is further trained using historical user activity data. The purpose of the classification model is to estimate the probabilities of events, including determining a relationship between features and the probabilities of particular outcomes. For instance, an activity score of a user is used to predictively evaluate whether user activity for a specific time frame (e.g., week in an educational class, semester, year) will be high or low. An activity score for an individual user (e.g., student user) is a predictive analytic derived from a weighted analysis of user activity data associated with a specific user. As previously identified, a weighting for specific features/variables is determined through dimensionality reduction processing (e.g., selection of a principal component). When normalized input feature data (e.g., user activity data) is mapped in a PCA space, activity scores for users are projected as data vectors of user activity data.

An exemplary classification model is adapted, through training on evaluation of historical activity data, to generate a classification as to a level of user activity of a user based on a comparative evaluation of activity scores for users (e.g., student users associated with an educational frame of reference designation and/or a temporal frame of reference). In one example, a comparative evaluation is a threshold evaluation pertaining to an activity score for each of a plurality of users (e.g., student users). For instance, activity scores of student users may be comparatively evaluated against a median activity score for users associated with the educational frame of reference designation, where a threshold evaluation is used to identify users whose activity scores are within certain threshold values. In one technical instance, a threshold value is set to identify a low activity score relative to the median activity score. In another technical instance, a threshold value is set to identify a high activity score set relative to the median activity score. For example, activity scores in the bottom and top fifteen percent (15%) relative to a median activity score are provided as labeled examples for supervised binary classification, where a real-time (or near real-time) evaluation of activity scores identify activity scores in the bottom and top fifteen percent metrics respectively as low activity and high activity. However, it is to be recognized that developers can set a threshold value, for threshold evaluation, to any desired metric without departing from the spirit of the present disclosure. In some examples, threshold values for classification may be set relative to a frame of reference designation. For instance, an educational frame of reference designation may vary where rules may be set to apply a predetermined threshold (e.g., threshold values) to evaluate activity scores based on the types of educational frame of reference designation selected. That is, threshold values for evaluating an activity scores of users of an educational class may vary from threshold values for evaluating activity scores of users of a school district.

In some alternative examples, threshold evaluations can be set to evaluate activity scores relative to historical activity scores when generating determinations regarding a level of user activity for a plurality of users (e.g., student users of an educational class). For instance, activity scores can be generated for historical period of time and comparatively evaluated with currently generated activity scores. This may provide a unique perspective for evaluating user activity, where user activity can be framed relative to past user activity which is beneficial for generating data insights about user activity. For example, comparative evaluation of activity scores relative to historical activity scores can enable group-specific designations of users associated with an educational frame of reference designation. As assignments and user activity may vary, this type of contextual information may be useful for teachers to understand how users are interacting with application/services and/or processing specific assignment content.

Trained AI processing is further adapted to output the classification of the level of user activity for one or more of the plurality of users (e.g., student users). In one example, classifications of levels of user activity are output to a data insight generation application/service to generate data insights pertaining to exemplary classifications. While it is to be recognized that any results generated from application of trained AI processing may be used to aid training and updating of a trained model, each and every classification regarding levels of user activity may not be necessary for notification purposes. That is why classifications pertaining to one or more users (e.g., student users) may be selected chosen for output. For instance, users that are identified as satisfying one or more thresholds (e.g., for high level or user activity or low level of user activity) are identified for output. As such, one or more classifications (e.g., associated with one or more users) may be selected for output such as those users that are classified as having low levels of user activity and/or high levels of user activity. In some alternative examples, developers may apply rules for selection of classifications for output. For example, a rule may be set to output any classifications that correspond to those who are predicted to have a low level of user activity and/or high level of user activity. In another example, a rule may be set to select N number of classifications for output (e.g., classifications having the N number of highest or lowest activity scores). In yet another example, a rule may be set to output all classifications generated. For example, a data insight may be generated providing a class report of classifications of all student users and/or evaluate students relative to historical classifications.

The present disclosure further discloses generation of data insights pertaining to a classification of the level of user activity for one or more of the plurality of users (e.g., student users). For example, a data insight generation application/service receives classifications output by trained AI processing and generates data insights pertaining to classification of levels of user activity for users. Processing for generation of data insights and execution of data insight generation applications/services is known to one skilled in the field of art. Above what is traditionally, known data insights are adapted to be generated based on classifications of levels of user activity for one or more of a plurality of users (e.g., student users) with a specific domain (e.g., educational software platform). For example, an exemplary data insight comprises a classification of a level of user activity of users of an education class with respect to usage of applications/services of an educational software platform. Furthermore, additional processing is executed to correlate an exemplary classification with specific users of a software data platform. As previously referenced, user identification is removed in the normalization of the input feature data (e.g., user activity data) to avoid any bias in generation of a classification. Once classifications are output, processing may occur to correlate classifications with specific users. For instance, generated classifications are correlated with student users (e.g., of an educational class) that use an educational software platform. This processing enables rich and contextual data insights to be generated pertaining to specific users. In some alternative examples, user correlation processing is not required to generate data insights. As an example, a data insight may be generated that evaluates student users of an educational class as a whole, where individual classifications may not be required to generate such a data insight.

In further technical instances, data insights are generated from historical user activity data. As previously referenced, user activity data may comprise historical user activity data (e.g., historical classifications of levels of user activity), which can factor into predictive classifications of levels of user activity. It is further to be recognized that exemplary classifications, generated by trained AI processing, can further be comparatively evaluated with historical user activity data (including prior generated classifications) to enhance the comprehensiveness of generated data insights as well as provide different frames of reference. For instance, a data insight may provide contextual information on trends/ patterns of user activity by framing a prediction relative to past predictions and/or performance of a user. In even further examples, a data insight may be generated providing a timeline of user activity analysis, such as a timeline of predictions as to levels of user activity (e.g., past, present and future). In alternative examples, accuracy pertaining to classifications of levels of user activity for one or more users can be checked against actual performance across an educational software platform. For instance, a classification of a low level of user activity can be correlated with a students' actual performance relative to a weekly assignment (e.g., did the student turn the assignment in, was it timely, how well did the student do). This type of contextual analysis leads to more comprehensive and meaningful data insights for evaluating student user activity.

In some examples, exemplary data insights pertaining to classification of user activity of an educational software platform can be generated and stored (e.g., for subsequent rendering at a later point in time). In other examples, generated data insights are immediately caused to be rendered, for example, through a GUI of an educational software platform. In one example, processing of the present disclosure causes rendering of a data insight comprising the classification of the level of user activity for the one or more of a plurality of student users. Causation of rendering may comprise transmitting data for rendering exemplary data insights to a computing device (e.g., client computing device) that presents a GUI representation of an application/ service (e.g., of an educational software platform). A data insight may then be rendered and presented via a display associated with a computing device such as a client computing device.

Exemplary technical advantages provided by processing described in the present disclosure comprise but are not limited to: improved processing for management of user activity data to generate meaningful classifications regarding levels of user activity that are contextually relevant and understandable; generation and application of novel trained AI processing that is adapted to generate predictive insights from contextual relevance analysis of user activity data of a distributed software platform (e.g., educational software platform); implementation of one or more trained machine learning models (e.g., a hybrid machine learning model) to execute dimensionality reduction processing and classification processing to efficiently and accurately generated exemplary classifications of the present disclosure; adaptation of dimensionality reduction processing for the specific purpose of analysis of user activity data of a domain-specific software data platform; novel relevance analysis applied by trained AI processing that analyzes historical and current iterations of user activity data in a contextually relative manner (e.g., across peers and/or relative to frame of reference designations described herein); automatic generation of classifications of levels of user activity that are usable to generate predictive insights for a software data platform; automatic generation of predictive insights that are derived from analysis of user activity data; an improved user interface (GUI) adapted to provide notifications of predictive insights which are extensible to be integrated within GUIs of a plurality of applications/services associated with a distributed software platform; improved processing efficiency (e.g., reduction in processing cycles, saving resources/bandwidth) for computing devices when generating exemplary classifications and exemplary data insights; reduction in latency through efficient processing operations that improve correlation of content among different applications/services including integration of exemplary notifications inline within different host application/service endpoints; improve accuracy and precision in application of trained AI processing when generating predictive outcomes associated with a domain (e.g., an education-specific domain); and improving usability of host applications/services for users via integration of processing described herein, among other technical advantages.

FIG. 1A illustrates an exemplary system diagram 100 of components interfacing to enable automatic generation of classifications of levels of user activity pertaining to usage of a system or service, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in process flow 120 (FIG. 1B), method 200 (FIG. 2) as well as processing described in and associated with visual diagrams of FIGS. 3A-3C and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., educational software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; an activity classification component 106; a component for implementation of trained AI processing 108; and knowledge repositories 110.

System diagram 100 comprises user computing device(s) 102. An example of a user computing device 102 is a computing system (or computing systems) as described in the description of FIG. 4. In one example, user computing device(s) 102 are intended to cover examples where a computing device is a client computing device that is executing an application or service configured to enable access a distributed software platform. In alternative examples, a user computing device 102 may be one or more computing devices of a software data platform that are used by developers to execute processing for training exemplary AI processing and/or applying trained AI processing to generate classifications of levels of user activity as well as data insights. For instance, one or more user computing devices 102 may be adapted to execute processing operations of the activity classification component 106 and/or a component for implementation of trained AI processing 108.

Figure 3A:
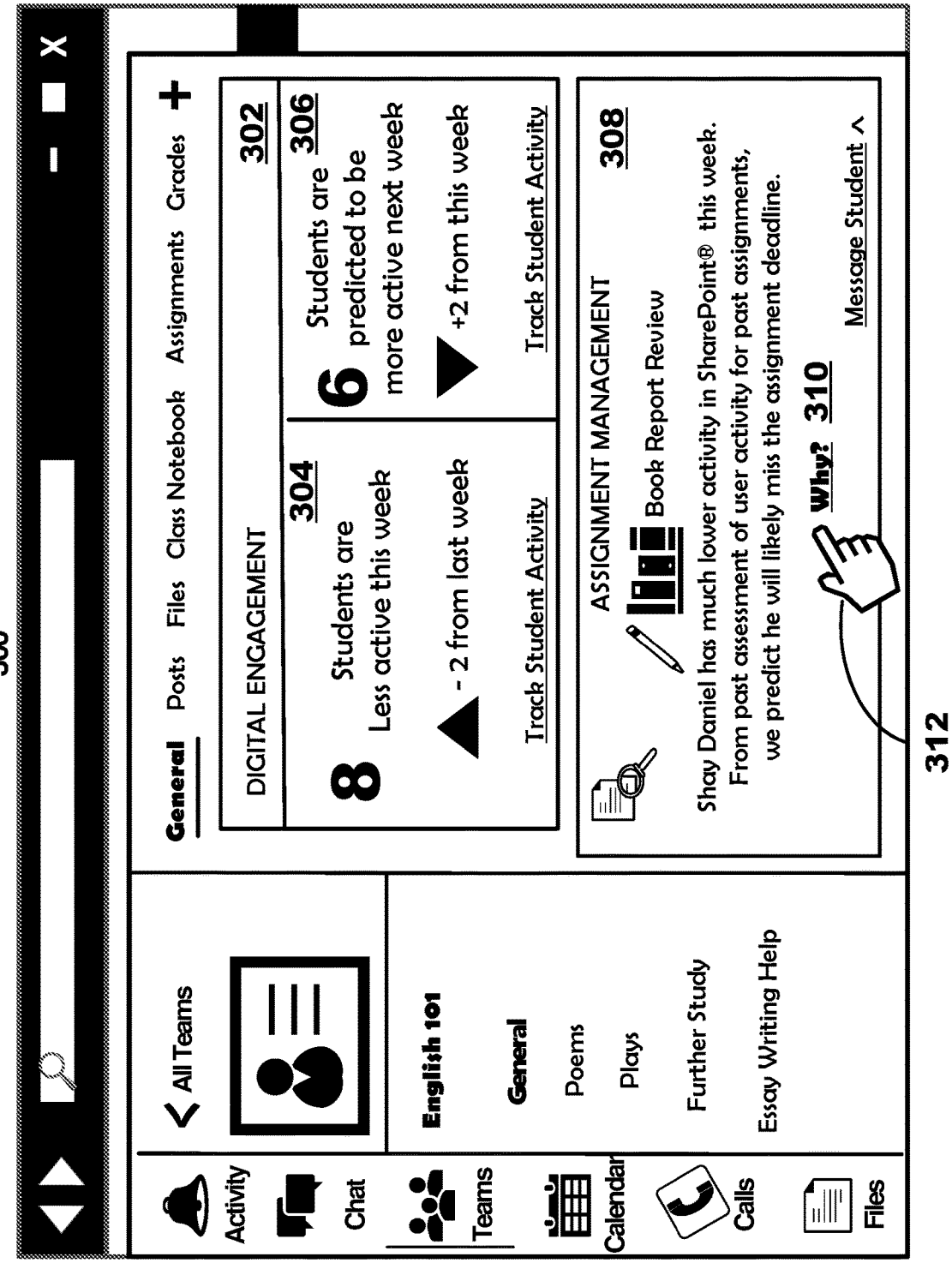
Figure 3B:
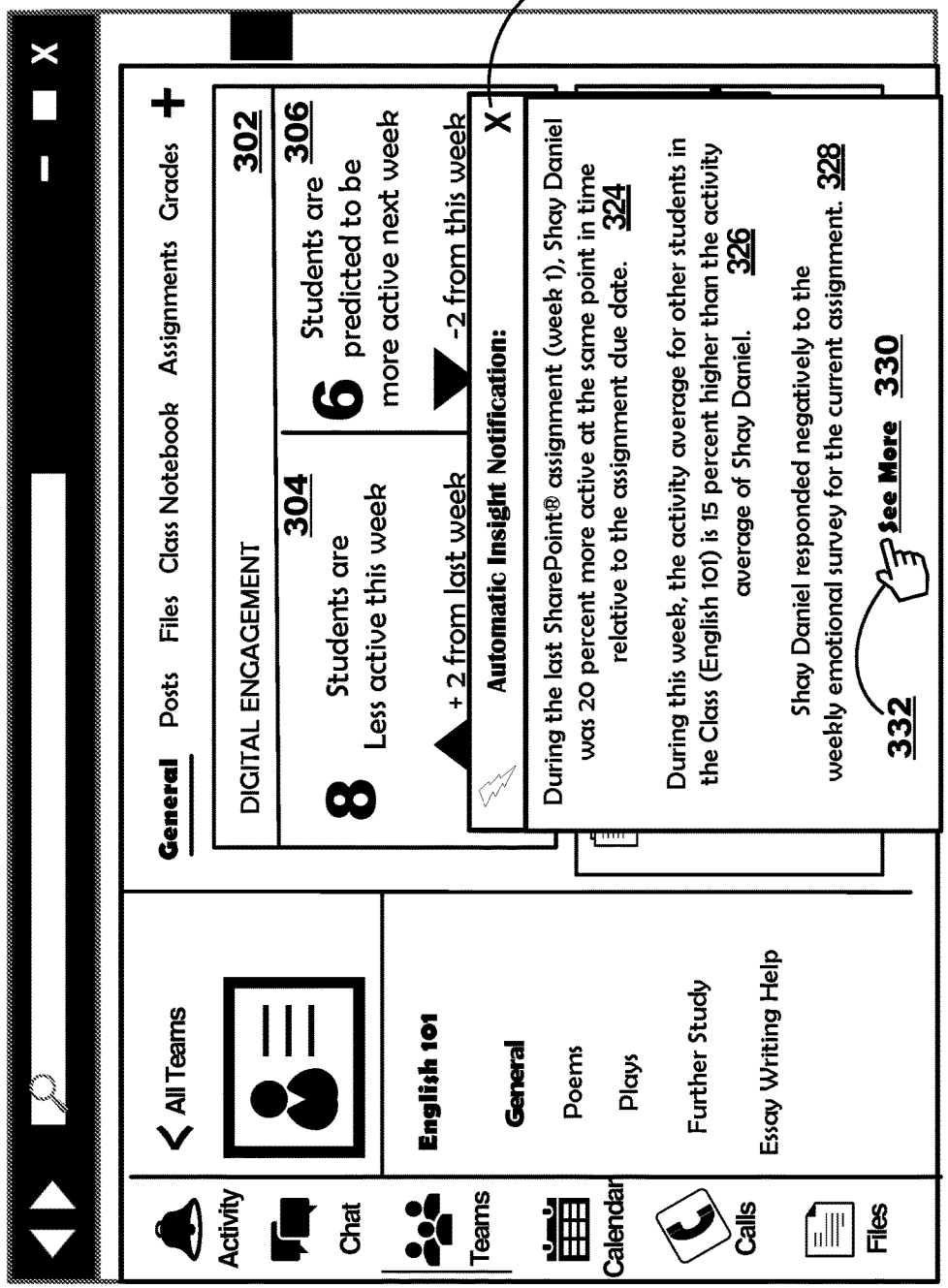

The application/service component 104 is one or more computer components (hardware, software or a combination thereof) configured to manage host applications/services and associated endpoints. As previously references, the application/service endpoint component 108 interfaces with other computer components of system diagram 100 to enable management of presentation of exemplary notifications in a contextually relevant manner (e.g., inline with content of a specific host application/service endpoint). Inline, as referenced in the present disclosure, is intended to refer to technical instances where data is embedded as a content portion (e.g., data object), among other content portions, that is displayable within a rendering of operating system content and/or GUI of a host application/service endpoint. Non-limiting examples of notifications and/or data insights presented inline are illustrated in FIGS. 3A-3C. The application/service component 104 is further configured to present, through interfacing with other computer components of system diagram 100, an adapted GUI that provides user notifications, GUI menus, GUI elements, etc., to manage rendering of message notifications and automatic notifications thereof.

An application/service component 104 further manages presentation of a GUI usable to present an exemplary notification and foster user interaction therewith. A host application/service configured to enable execution of tasks by one or more user accounts. In some examples, an exemplary host application/service may be a component of a distributed software data platform providing a suite of host applications/services and associated endpoints. A (distributed) software data platform is configured to provide access to a plurality of applications/services, thereby enabling cross-application/service usage to enhance functionality of a specific application/service at run-time. For instance, a software platform enables interfacing between an OS of user computing device(s) 102 and host applications/services accessed therethrough. A domain-specific software data platform, such as an educational software platform, may comprise a plurality of host applications/services that are adapted for management of content associated with a specific domain (e.g., education). Distributed software data platforms may further manage tenant configurations/user accounts to manage access to features, applications/services, etc., as well access to distributed data storage (including user-specific distributed data storage). Moreover, specific host applications/services (including those of a distributed software platform) may be configured to interface with other non-proprietary application/services (e.g., third-party applications/services) to extend functionality including data transformation and associated implementation.

For ease of understanding and explanation, the present disclosure referenced education as an exemplary domain. However, it is to be recognized that processing of the present disclosure is adaptable to derive binary classifications for any type of domain. Continuing with education as an example domain, user activity data is accessed pertaining to user interactions by a plurality of users with an educational software platform. Exemplary user activity data pertains to user interactions, by a plurality of users (e.g., student users) with each of a plurality of application and/or services associated with a distributed software platform.

An educational software platform is a non-limiting example of a distributed software platform. A distributed software platform is a software system connecting components thereof over a distributed network connection. Implement of components to enable operation of components of a software data platform over a network connection are known to one skilled in the field of art. For instance, a distributed software platform may be backed by one or more services to enable the distributed software platform to be implemented in a variety of technical distributed data scenarios including but not limited to: (SaaS); PaaS; IaaS. Moreover, the distributed software platform may support many different programming languages, tools, and frameworks, etc., including both organizationally proprietary systems (e.g., MICROSOFT®-specific) and third-party software and systems including those of independent software vendors. As such, users of a distributed software platform (e.g., educational software platform) create user activity data by interacting with a plurality of application/services adapted for a specific domain (e.g., education).

Continuing with an education example, an educational software platform enables students, teachers, administrators, parents, etc., to be connected through customized versions of software products that helps guide learning (online, in-person and/or hybrid learning) and management of associated educational data. Integration of educational platforms provide online learning resources and implementation of the same is known to one skilled in the field of art. As a point of reference, capabilities of an educational platform comprise but are not limited to: registering students in courses; conducting online learning/classes; document storage, retention and management; assignment/document submission and grading, transcript management, student assessment evaluation; management of access to content provided for learning; building student schedules; tracking student attendance; managing data for extracurricular activities; user feedback (including student-specific surveys); and managing student-related data needs in a school, among other examples. One example of a well-known distributed software platform is MICROSOFT365®, which may be tailored for management of a specific document (e.g., education). In an educational domain example, applications/services of a distributed software platform (e.g., MICROSOFT365®) are tailored to further educational experiences for users. For instance, an online classroom and resources for management of associated users, content, etc., are enabled through MICROSOFT® Education thereby providing an online learning (or hybrid learning) environment.

In an educational example, user activity data pertains to user interactions by student users with applications/services associated with applications/services of an educational software platform. For instance, user activity data comprises event count data indicating a count of user interactions with specific application/services of an educational software platform and/or specific features of associated applications/services. As there are a plurality of student users to consider, a plurality of applications/services associated with an educational software platform and an even greater number of individual features to consider access to, a dataset of counts of user activity data for a plurality of student users is very robust.

In further examples, user activity data is further made even more robust by the inclusion of additional data types. As an example, user activity data may comprise categorical representations of user feedback received from users of the educational software platform. For instance, user feedback may be received through one or more applications/services associated with an educational software platform. For instance, categorical representations of student surveys, provided through educational software platform, are collected to represent social and emotional state of student users at a specific point of reference. In another example, categorical representations may be generated relative to one or more of: prior classification determinations (e.g., previous classifications of levels of user activity); historical user activity data for one or more users; and/or generated data insights (e.g., pertaining to past user activity predictions). An exemplary point of reference may pertain to a predetermined period of time and/or be determined relative to an event (e.g., assignment, exam, progress report, etc.) occurring through the educational software platform. In even further examples, user activity data may comprise categorical representations of prior classifications of user activity of user (e.g., over a historical period of time) and/or categorical representations of data insights associated with a user/group of users (e.g., binary determinations derived from analysis of previously generated data insights). Such data types can further provide context for user activity with an educational software platform as well as provide talking points to follow-up with a student user, parent, teacher, etc., regarding a classification of a level of user activity.

Non-limiting examples of host applications/services that are applicable in the present disclosure, including integration within exemplary software data platforms, comprise but are not limited to: educational information management applications/services; open-source collaborative framework applications/services; video conferencing applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping applications/services; calendaring applications/services; electronic payment applications/services; digital data storage or distributed data storage applications/services; web conferencing applications/services; call communication applications/services; language understanding applications/services; bot framework applications/services; networking applications/services; social networking applications/services; and suites of applications/services that may collectively comprise a combination of one or more of the previously mentioned applications/services, among other examples. The application/service component 104 further manages respective endpoints associated with individual host applications/services, which have been referenced in the foregoing description.

The application/service component 104 is further configured to present, through interfacing with other computer components of system 100, an adapted GUI that provides user notifications, GUI menus, GUI features, etc., related to the provision of classifications of levels of user activity data (e.g., of an educational software platform) and/or associated data insights. In other instances, an application command control (e.g., user interface ribbon and/or GUI menu) may be adapted to include selectable user interface features related to management of notifications. For instance, GUI features may be automatically generated and presented to bring attention to message notifications and associated content as well as action taken, such as automatically applying updates to computing devices. Non-limiting visual examples of an improved GUI, and GUI elements provided therein, are provided in FIGS. 3A-3C.

Furthermore, the present disclosure is further adapted to enable trained AI processing to further contemplate other types of signal data that may be collected through various host applications/services by the application/service component 104. For instance, application of trained AI processing (e.g., one or more trained machine learning models may be adapted to evaluate not only user activity data but other types of contextual data including past and/or current user actions, user preferences, application/service log data, etc., that are each associated with one or more user accounts. This additional signal data analysis may help yield determinations as to how (and/or when) to present exemplary GUI notifications to users. Notably, different users (e.g., students, teachers, school administrators, parents) may be utilizing an educational software platform, where GUI notifications can be contextually rendered from analysis of signal data that is customized for a user. Non-limiting examples of signal data that may be collected and analyzed comprises but is not limited to: device-specific signal data collected from operation of one or more user computing devices; user-specific signal data collected from specific tenants/user-accounts with respect to access to any of: devices, login to a distributed software platform, applications/services, etc.; application-specific data collected from usage of applications/services and associated endpoints; or a combination thereof. Analysis of such types of signal data in an aggregate manner may be useful in helping generate contextually relevant determinations, data insights, etc. Analysis of exemplary signal data may comprise identifying correlations and relationships between the different types of signal data, where telemetric analysis may be applied to generate determinations with respect to a contextual state of user activity with respect to different host application/services and associated endpoints.

The activity classification component 106 is one or more computer components (hardware, software or a combination thereof) configured to execute and manage processing operations related to generation and provision of exemplary classifications as to a level of user activity by a use, predictive insights generated therefrom as well as generation of exemplary GUI notifications. The activity classification component 106 is configured to execute any processing operations described herein, including those described relative to system diagram 100 (FIG. 1A), process flow 120 (FIG. 1B), method 200 (FIG. 2), and processing associated with visual diagrams of FIGS. 3A-3C and further described in the accompanying description. It is further to be recognized that an order of execution of processing operations by the activity classification component 106 may vary without departing from the spirit of the present disclosure.

As referenced in the foregoing description, the activity classification component 106 and/or the application/service component 104 are configured to interface with a component for implementation of trained AI processing 108 to aid processing in various contextual scenarios. The component for implementation of trained AI processing is configured to manage implementation of one or more trained AI models. Implementation of trained AI modeling including creating, adapting, training, and updating of trained AI processing is known to one skilled in the field of art. Trained AI processing is applicable to aid any type of determinative or predictive processing including specific processing operations described about with respect to determinations, classification ranking/scoring and relevance ranking/scoring. Moreover, a component for implementation of a programmed software module and/or trained AI processing 110 may be applied to aid generation of processing determinations of other components of system diagram 100. An exemplary component for implementation trained AI processing 108 may manage AI modeling including the creation, training, application, and updating of AI modeling. In cases where trained AI processing is applied, general application of trained AI processing including creation, training and update thereof is known to one skilled the field of art. Above what is traditionally known, trained AI processing may be adapted to execute specific determinations described herein with reference to any component of system diagram 100 and processing operations executed thereby. For instance, an AI model may be specifically trained and adapted for execution of processing operations comprising but not limited to: collecting and analyzing user activity data; execution of dimensionality reduction processing that is adapted for management of user activity data of domain-specific software data platform; curating classifications to determine which to output for generation of data insights; generating predictive insights; generating GUI notifications for predictive insights; executing data correlation and relevance analysis; generating confidence scoring for selective output of predictive insights; and generation of data for rendering GUI content and updates, among other examples. Exemplary AI processing may be applicable to aid any type of determinative or predictive processing by any components of system diagram 100, via any of: supervised learning; unsupervised learning; semi-supervised learning; or reinforcement learning, among other examples. In one example, trained AI processing of the present disclosure executes a hybrid machine learning model that is adapted to execute processing for dimensionality reduction processing and classification processing to efficiently and accurately generated exemplary classifications of the present disclosure. For example, an exemplary hybrid machine learning model may be adapted to execute unsupervised learning when dimensionality reduction processing is performed and subsequently execute supervised learning when classification processing is performed. In alternative examples, processing of the present disclosure applies multiple trained machine learning models that are each individually adapted to respectively execute dimensionality reduction processing and classification processing.

Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, a component for implementation of trained AI processing 108 may be configured to apply a ranker to generate relevance scoring to assist with any processing determinations with respect to any relevance analysis described herein. Non-limiting examples of relevance scoring, and specific metrics used for relevance scoring have been referenced in the foregoing description and are subsequently described including the description of method 200 (FIG. 2). Scoring for relevance (or importance) ranking may be based on individual relevance scoring metrics described herein or an aggregation of said scoring metrics. In some alternative examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing.

Continuing examples where a domain is education, a proprietary deep learning model is built and trained to identify behavioral patterns that predict individual activity of a student given a sequence of student interactions. The model applies a proprietary, student-centric (personalized) self-attention mechanism to consider patterns of user activity across an educational frame of reference designation when making a prediction on said student. A deep learning model of the present disclosure focuses on evaluation of user activity rather than performance outcomes and is therefore able to provide interpretable outcomes that prescribe actionable suggestions to users (e.g., educators, parents).

A trained AI model is generated to be a robust model that can understand intricacies of domain-specific scenarios. For instance, millions of logs of user data are collected, aggregated, analyzed, and used to train an AI model for a contextual understanding of user activity over an educational year. For training purposes, a rolling window may be implemented to specify a time period (temporal filter) across aggregated data. Training tunes an AI model to understand scenarios that may impact students as a whole (e.g., over specific time periods) and avoid bias against an individual student in an assessment of that student. For instance, student participation may be less over certain periods of time during a school year because schools may be on break (e.g., winter break, spring break, summer break). If students have days off, that should not be counted against them as a reason why their participation may be lower over a given time period. Similarly, real-time execution of a trained AI model is adapted, through training and implementation of business logic (applied business logic rules), to provide context for executing an unbiased assessment of a student. Exemplary business logic rules are configured for an education domain of the educational software platform and used to evaluate a relevance of the mobility determinations generated by a trained AI model. In some examples, specific business logic rules may further be directed to contextual scenarios that are specific to a school/university, school district, school, class/ course, etc. In this way, trained AI processing can further identify students in similar circumstances as a baseline for evaluating user behavior, such as when selecting specific groups of users to execute analysis on.

Signal data collected for a specific event (e.g., student assignment) are treated as a series of events in time, each of which is a collection of features. Specific events are fed to the deep learning modeling which is trained to generate quantiles (or quartiles) for classifying predictions. For every training sequence, each event is composed of multiple features that are separately encoded numerically to an appropriate vector according to their underlying input variable type. Signal data indicated as events contain multiple features each of which is broken down to several input variables. Non-limiting examples of such variables comprise but are not limited to various types of user activity data previously described.

Trained AI processing of the present disclosure is further configured to implement additional trained AI modeling, in parallel with a trained attention model, for comparison evaluation and improvement of accuracy and precision of exemplary modeling. For instance, a trained AI model may be implemented based on decision trees for comparative evaluation. Implementation of AI modeling using decision trees is known to one skilled in the field of art. Success of trained AI modeling is evaluated by criteria that comprising: accuracy in classification predictions; beating simpler, baseline, approaches; identifying meaningful and interpretable behaviors captured by trained machine learning models; and robustness to bias. Using either knowledge distillation, or training from scratch, a decision tree/random forest model may be applied to develop a baseline for generating relevant predictions.

Once a successful model is generated, it is important to make sure that bias is avoided. One non-limiting example of a way in which bias can be introduced into user activity analysis is by identifying a specific user account and/or class/course. To avoid bias, additional processing may be executed comprising one or more of: evaluating the impact of masking user identifiable features; retraining AI modeling without user identifiable features to quantify the contribution of personalization to success of the modeling; investigate algorithmic mitigation approaches (e.g., demographic parity) to set a discrimination threshold per user group; and execute processing that swaps out attributes of identification (e.g., user account and/or class/course) with random identifiers. Developers can apply one or more of these approaches to tune a trained AI model based on threshold for accuracy and/or precision with respect to results of a trained AI model.

When a model is not successful in proving a hypothesis there are many potential points of failure that can mask each other. Model iteration is applied in training to attempt to isolate, uncover and mitigate potential technical errors. Non-limiting examples of such processing may comprise but is not limited to: verify convergence of the trained AI model on an easier/trivial hypothesis or mock data; investigate learning process using learning telemetry graphs (e.g., rate of change for different layers can indicate there is a gradient propagation issue and lead to the addition of stabilization/ regularization layers); hyperparameter tuning and architecture search; introducing new engineered features such as daily/weekly event aggregations to session data and evaluate impact on performance; and evaluate impact of data pooling versus learning a model per class/course to investigate data drift related issues, among other examples. Developers can apply one or more of these approaches to tune a trained AI model based on threshold for accuracy and/or precision with respect to results of a trained AI model.

As referenced in the foregoing description, knowledge repositories 110 may be accessed to manage data aiding operation of any other computer components described in system diagram 100. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations described herein. Examples of data maintained by knowledge repositories 110 comprises but is not limited to: activity data logs; generated classification predictions; data insights and GUI notifications; collected signal data (e.g., from usage of an application/service, device-specific, user-specific); telemetry data including past and present usage of a specific user and/or group of users; data for execution of application/ services including host application/services and associated endpoints; corpuses of annotated data used to build and train AI processing classifiers for trained AI modeling; access to entity databases and/or other network graph databases usable for evaluation of signal data; web-based resources including any data accessible via network connection including data stored via distributed data storage; trained bots including those for natural language understanding; software modules and algorithms for contextual evaluation of content and metadata; and application/service data (e.g., data of applications/services managed by the application/ service component 104) for execution of specific applications/services including electronic document metadata, among other examples. In even further examples, telemetry data may be collected, aggregated and correlated (e.g., by an interfacing application/service) to further provide computer components of system diagram 100 with on demand access to telemetry data which can aid determinations generated thereby.

FIG. 1B illustrates an exemplary process flow 120 for improving generation of classifications of levels of user activity via execution of dimensionality reduction processing, with which aspects of the present disclosure may be practiced. As indicated in the foregoing, dimensionality reduction processing is the transformation of data from a high-dimensional space into a low-dimensional space so that a low-dimensional representation retains some meaningful properties of the original data. In the present disclosure, trained AI processing is adapted to execute dimensionality reduction processing using user activity data associated with a domain-specific software data platform (e.g., an educational software platform). For example, the component for implementation of trained AI processing 108 implements one or more trained machine learning models to generate classifications of levels of user activity for each of a plurality of users. In one example, a hybrid machine learning model is adapted to execute dimensionality reduction processing and classification processing, thereby combining both unsupervised machine learning and supervised machine learning to efficiently and accurately generated exemplary classifications of the present disclosure.

Process flow 120 illustrates a progression of linear graphical representations 122-128 visually representing a progression of dimensionality reduction processing through application of a linear PCA algorithm that is adapted to work with user activity data of an educational software platform to aid classification of levels of user activity for student users. For instance, student users are described as vectors of multiple event count data (e.g., event count data pertaining to exemplary user activity data) and/or exemplary categorical representations described herein, where user activity data is normalized to a relevant frame of reference (e.g., educational frame of reference designation and/or temporal frame of reference). As user activity, assignments, etc., may regularly vary (e.g., week to week) for a specific educational class, some types of event count data may be more relevant than other types of event count data over a temporal frame of reference. As such, executing dimensionality reduction processing can determine variance between different types of user activity data to identify patterns in user activity (corresponding with a frame of reference) based on correlations that are identified between input feature data. This type of analysis improves efficiency for downstream processing by efficiently reducing a dataset while focusing attention on specific types of data correlations that are most useful for classification of levels of user activity of student users (e.g., according to an applied frame of reference).

In the examples shown in process flow 120, a first linear representation 122 a plurality of student users of an educational software platform is represented as vectors in a linear graphing. For ease of explanation, each student user is illustrated as a vector of user activity with two features. Features are measurements of different types of user activity data, for example, event counts or rates pertaining to specific interactions with applications/services (and associated features) of an educational software platform. Other non-limiting example of user activity data as previously described may also be represented as features. Each feature can be normalized by the average of a student's peer group (e.g., student users in an educational class). As indicated in the foregoing description, other types of educational frame of reference designations and/or temporal frame of references maybe utilized to aid normalization of feature data. The result is to generate a predictive classification predicting whether student user activity will be 'high' or 'low' over a predetermined period of time (e.g., a week). As such, an interest in feature analysis is to correlate input feature data that is very robust to generate a broad binary categorization of high-vs-low activity.

A second linear representation 124 is further presented in process flow 120, progressing from a plotting of input feature data as shown in the first linear representation 122. The second linear representation 124 illustrates a result of projecting input feature data in a PCA space to aid identification of variance across candidate principal components which may be used for dimensionality reduction processing. As indicated in the foregoing, PCA performs a linear mapping of input data to a lower-dimensional space in such a way that the variance of the data in the low-dimensional representation is maximized. In doing so, a covariance matrix (and in some cases correlation matrix) of the input data is constructed, and the eigenvectors and eigenvalues on said matrix are computed. Computed eigenvectors and eigenvalues of a covariance (or correlation) matrix represent a core part of PCA. Determined eigenvectors correlate to principal components of a PCA space and determine the directions of the new PCA space. The corresponding eigenvalues determine the magnitude of the corresponding eigenvectors. That is, computed eigenvectors represent a new set of axes of the PCA space, and the eigenvalues carry the information of quantity of variance that each eigenvector possesses within that PCA space. This processing is visually represented in the second linear representation 124, where, within the PCA space, a new 'x' axis separates high vs low activity as a combination of the original user activity features (e.g., input feature data).

A third linear representation 126 is further presented in process flow 120, progressing from a projection in a PCA space as shown in the second linear representation 124. The third linear representation 126 illustrates projection of feature vectors to a first principal component. A first principal component in principal component analysis identifies the direction of maximal variance in the feature space. As indicated in the foregoing description, user activity data can vary greatly on a weekly basis due to the robustness and variety of applications/services that are associated with an educational software platform. As such, executing PCA analysis in real-time (or near real-time) for each temporal frame of reference can help identify the most important weighting of features/variables of user activity data (e.g., on a weekly basis).

A fourth linear representation 128 is further presented in process flow 120, progressing from a projection in a PCA space as shown in the third linear representation 126. As identified in the foregoing, eigenvectors that have the most variance are chosen and those with less variance are discarded. This results in a lower-dimensional representation of original input feature data. being able to be mapped in a PCA space according to one or more principal components. The fourth linear representation 128 illustrates a mapping of feature input data according to a single principal component. The chosen eigenvectors, corresponding with one or more principal components, are then used to reconstruct a large fraction of the variance of the original input data. In practice, a subset of one or more eigenvectors can often be interpreted in terms of the large-scale physical behavior of the system because said eigenvectors often contribute the vast majority of the system's energy, especially in low-dimensional systems. The result is a low-dimensional data set with some data loss (as compared to the original input feature data) but retaining the most important variance to the space (e.g., spanned by a subset of one or more eigenvectors).

In a practical example, each student user is given an activity score. A classification algorithm is then applied to generate classifications for one or more of the plurality of student users. For example, a classification model is applied that generates labels (e.g., classification labels) for student users as to a predicted level of user activity. The purpose of the classification model is to estimate the probabilities of events, including determining a relationship between features and the probabilities of particular outcomes. For instance, an activity score of a user is used to predictively evaluate whether user activity for a specific time frame (e.g., week in an educational class, semester, year) will be high or low. An activity score for an individual user (e.g., student user) is a predictive analytic derived from a weighted analysis of user activity data associated with a specific user. As previously identified, a weighting for specific features/variables is determined through dimensionality reduction processing (e.g., selection of a principal component). When normalized input feature data (e.g., user activity data) is mapped in a PCA space, activity scores for users are projected as data vectors of user activity data.

An exemplary classification model is adapted, through training on evaluation of historical activity data, to generate a classification as to a level of user activity of a user based on a comparative evaluation of activity scores for users (e.g., student users associated with an educational frame of reference designation and/or a temporal frame of reference). In one example, a comparative evaluation is a threshold evaluation pertaining to an activity score for each of a plurality of users (e.g., student users). For instance, activity scores of student users may be comparatively evaluated against a median activity score for users associated with the educational frame of reference designation, where a threshold evaluation is used to identify users whose activity scores are within certain threshold values. In one technical instance, a threshold value is set to identify a low activity score relative to the median activity score. In another technical instance, a threshold value is set to identify a high activity score set relative to the median activity score. For example, activity scores in the bottom and top fifteen percent (15%) relative to a median activity score are provided as labeled examples for supervised binary classification, where a real-time (or near real-time) evaluation of activity scores identify activity scores in the bottom and top fifteen percent metrics respectively as low activity and high activity. However, it is to be recognized that developers can set a threshold value, for threshold evaluation, to any desired metric without departing from the spirit of the present disclosure.

FIG. 2 illustrates exemplary method 200 related to automatic generation of classification of levels of user activity, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1A) and process flow 120 (FIG. 1B). Processing operations performed in method 200 may correspond to operations executed by a system and/or service that execute computer modules/programs, software agents, application programming interfaces (APIs), plugins, AI processing including application of trained data models, intelligent bots, neural networks, transformers and/or other types of machine-learning processing (e.g., trained machine learning modeling including hybrid machine learning models), among other examples. In one non-limiting example, processing operations described in method 200 may be executed by a computer component such as: a user computing device 102; an application/service component 104; an activity classification component 106; a component for implementation of trained AI processing 108, or a combination thereof. In distributed examples, processing operations described in method 200 may be implemented by one or more computer components connected over a distributed network. For example, computer components may be executed on one or more network-enabled computing devices, connected over a distributed network, that enable access to user communications.

Method 200 begins at processing operation 202, where user activity data of a distributed software platform is collected. The user activity data is raw signal data received from a plurality of applications or services associated with the educational software platform. An educational software platform is a non-limiting example of a distributed software platform. A distributed software platform is a software system connecting components thereof over a distributed network connection. Implementation of components to enable operation of components of a software data platform over a network connection are known to one skilled in the field of art. For instance, a distributed software platform may be backed by one or more services to enable the distributed software platform to be implemented in a variety of technical distributed data scenarios including but not limited to: SaaS; PaaS; CPaaS; and IaaS. Moreover, the distributed software platform may support many different programming languages, tools, and frameworks, etc., including both organizationally proprietary systems (e.g., MICROSOFT®-specific) and third-party software and systems including those of independent software vendors.

Collection (processing operation 202) of user activity data occurs as users perform different activities through a software data platform. For instance, a user login to an educational software platform may create a session where signal data may be logged relative to a session of user access to one or more applications/services of a software data platform (e.g., educational software platform). User activity data is recognized as application-specific signal data or service-specific signal data that pertains to user activity received through applications/services associated with the educational platform. For instance, user activity data comprises event count data indicating a count or rate of user interactions with specific application/services of an educational software platform and/or specific features of associated applications/services. As there are a plurality of student users to consider, a plurality of applications/services associated with an educational software platform and an even greater number of individual features to consider access to, a dataset of counts of user activity data for a plurality of student users is very robust. With respect to counts or rates of specific features of associated applications/services (e.g., of an educational software platform), specific applications/services and content associated with a domain may dictate what features that counts and/or rates are tracked. Evaluating event count data for different applications/services enables trained AI processing to identify patterns of user activity for a predetermined time period (e.g., a week), especially because users use different applications/services to complete different assignments as an educational class progresses. For instance, students may work exclusively in applications/services of a web-based collaborative platform (e.g., MICROSOFT® SHAREPOINT®) when completely an assignment in the first week and then use different applications/services of a collaborative communication application/service (MICROSOFT® TEAMS®) the next week, with minimal usage of applications/services of the web-based collaborative platform. As such, it is important to correlate patterns of activity among users and provide one or more frames of reference for classification evaluation so that inaccurate classifications or associated analytics/metrics are avoided. Non-limiting examples of user activity data associated with an educational software platform for which event count data may be generated and tracked comprises but are not limited to user activity data pertaining to: login information; access (including time and amount of access) to specific content, assignments, posts, feedback/comments, resources, meetings, tests/exams, etc.; starting and completion timing for completing tasks, assignments, etc.; collaborative interactions between users and/or teachers and students; modification of content; posting of content including assignments, exams, etc.; use of features, emojis, etc. and grading, among other examples. Other examples of signal data pertaining to user interactions with an educational platform are known to one skilled in the field of art.

In further examples, user activity data is further made even more robust by the inclusion of additional data types. As an example, user activity data may comprise categorical representations of user feedback received from users of the educational software platform. For instance, user feedback may be received through one or more applications/services associated with an educational software platform. For instance, categorical representations of student surveys, provided through educational software platform, are collected to represent social and emotional state of student users at a specific point of reference. In another example, categorical representations may be generated relative to one or more of: prior classification determinations (e.g., previous classifications of levels of user activity); historical user activity data for one or more users; and/or generated data insights (e.g., pertaining to past user activity predictions). An exemplary point of reference may pertain to a predetermined period of time and/or be determined relative to an event (e.g., assignment, exam, progress report, etc.) occurring through the educational software platform. In even further examples, user activity data may comprise categorical representations of prior classifications of user activity of user (e.g., over a historical period of time) and/or categorical representations of data insights associated with a user/group of users (e.g., binary determinations derived from analysis of previously generated data insights). Such data types can further provide context for user activity with an educational software platform as well as provide talking points to follow-up with a student user, parent, teacher, etc., regarding a classification of a level of user activity.

At processing operation 204, logs of user activity data are stored for recall. For instance, user activity data is stored on one or more distributed data storages (or distribute data storage systems). In one example, user activity data is stored via data storage of a file hosting service or a document management storage system. Importantly, it is recognized that user activity data is stored (and accessed) in compliance with privacy laws and regulations. Furthermore, exemplary AI processing (e.g., one or more trained machine learning models) is trained and executed in a privacy compliant manner where developers never see data due to compliance requirements/restrictions on access to user activity data. As identified in the foregoing description, signal data may be logged relative to a session of user access to one or more applications/services of a software data platform (e.g., educational software platform). For a class of students there is likely a plurality of logs each day of activity. In an educational space, a predictive outcome can either be straight forward (e.g., will a student turn in an assignment on time) or abstract (e.g., is a user going to reduce engagement over a given time period). For instance, a system of the present disclosure can be used to predict what will happen in a given week and provide those predictions as predictive insights and/or early warning indications of decaying performance of a student before it is too late for the teacher to take action and positively influence a behavior of the student.

Flow of method 200 then proceeds to processing operation 206. At processing operation 206, trained AI processing is managed that is adapted to contextually analyze the user activity data (e.g., of the educational software platform) for generation of exemplary classification of levels of user activity. Generation and management of a trained AI processing, such as one or more trained machine learning models, including training of one or more classifiers is known to one skilled in the field of art. Above what is traditionally known, processing is executed to feed trained AI modeling with raw signals pertaining to user activity data of an educational software platform. Trained AI processing is adapted, through training of a corpus of relevant training data (including historical user activity data), to execute dimensionality reduction processing as well as classification processing from analyzing a dimensionality reduction transformation. Classification labels are generated from said analysis, which can then be utilized to generate data insights pertaining to user activity with a domain-specific application/service or software data platform (e.g., educational software platform). In one example, trained AI processing of the present disclosure executes a hybrid machine learning model that is adapted to execute processing for dimensionality reduction processing and classification processing to efficiently and accurately generated exemplary classifications of the present disclosure. For example, an exemplary hybrid machine learning model may be adapted to execute unsupervised learning when dimensionality reduction processing is performed and subsequently execute supervised learning when classification processing is performed. In alternative examples, processing of the present disclosure applies multiple trained machine learning models that are each individually adapted to respectively execute dimensionality reduction processing and classification processing. Other non-limiting examples of trained AI processing that is applicable has already been described in the foregoing description including the description of system diagram 100 (FIG. 1A).

Management (processing operation 206) of AI processing may further comprise generating an AI model that is tuned to reflect specific metrics for accuracy, precision and/or recall before a trained AI model is exposed for real-time (near real-time) usage. Developers may set thresholds for specific metrics to make sure that trained AI modeling is operating as expected. Thresholds for metric evaluation of a specific trained AI model may vary, depending on developer specifications, without departing from the spirit of the present disclosure. In further examples, user feedback may be received and used to continuously update a trained AI model to improve predictions and generate the most contextually relevant insights. As such, any user activity, including user feedback received with respect to GUI notifications and/or predictive insights, social/emotional surveys, etc., may be used to update (processing operation 226) the any trained AI modeling. For instance, training data and/or a corpus of additional user activity data may be added and further used to build from previous iterations of the trained AI modeling.

Once a threshold (or thresholds) is met for exposing trained AI processing, flow of method 200 proceeds to processing operation 208. At processing operation 208, the trained AI processing is exposed for real-time (or near real-time) evaluation of user activity data. Processing for exposing trained AI processing for application is known to one skilled in the field of art.

At processing operation 210, trained AI processing (e.g., one or more trained AI models) is then applied. Processing operation comprises automatically applying trained AI processing that is adapted to generate a classification of a level of user activity for each of the plurality of student users based on at least an analysis of a dimensionality reduction transformation of the user activity data. In doing so, trained AI processing comprises execution of a plurality of processing operations (e.g., labeled 212-216 of method 200).

As a starting point for application of trained AI processing, input feature data is managed (processing operation 212). Management (processing operation 212) of input feature data comprises identifying input feature data for the trained AI processing to analyze. Exemplary input feature data is derived from exemplary user activity data, examples which have been previously described. In one example, trained AI processing (e.g., one or more trained AI models) comprises selection of input feature data as user activity data that indicates event count data for each of the plurality of student users of a software data platform (e.g., educational software platform). Other examples of user activity data previously described may be selected in addition to (or alternatively in lieu of) exemplary event count data. In even further examples, trained AI processing (e.g., one or more trained machine learning models) may be adapted to generate counts or rates of user activity according to different types of signal data. For instance, a count or rate of user activity data may focus on device-specific signal data, where user activity is counted relative to a specific computing device that a student user utilizes to access applications/services of an educational software platform. In another example, user-specific accounts or profile data may further be counted to track whether students log into applications/services individually or as part of groups. Yet another category for evaluation of counts/rates may focus on how frequently other users (e.g., parents, guardians, teachers) access user-specific assignments, progress reports, activities, etc. As such, it should be collectively recognized that user activity data can be a comprehensive evaluation of user activity from a variety of different perspectives.

Moreover, management of input feature data further comprises determining a frame for reference for evaluating the user activity data as input feature data. With respect to an educational software platform, a plurality of student users may span many geographical locations, schools, school districts, grades, etc. As such, the present disclosure manages user activity data according to an educational frame of reference designation and/or a temporal frame of reference (e.g., predetermined period of time). These levels of curation are applied to identify a group of users that are closely correlated and further identify a contextual framing of the user activity data for the group of users. In at least one example, business rules are applied to select an educational frame of reference designation and/or temporal frame of reference. As indicated in the foregoing description, developers can set one or more business rules to effectively manage a framing of user activity data and generate a variety of analytics and contextual data insights.

An educational frame of reference designation identifies a specific educational segmentation that corresponds with one or more student users (e.g., a group of users). An educational frame of reference designation aids identification of similar users (e.g., students in the same class) who have similar patterns of user activity, thereby providing the most appropriate manner by which to execute a comparative evaluation of user activity. In one example, an educational frame of reference designation is an educational class that comprises a plurality of student users, where user activity data of the plurality of student users of the educational class are evaluated. However, it is to be recognized that an educational frame of reference designation can be any type of educational segmentation of users including but not limited to: educational classes; schools; school districts; grade levels; user descriptors (e.g., age) and geographical descriptors, among other examples. In examples where trained AI processing is adapted to work with a different domain, it is to be recognized that a domain-specific frame of reference designation may be applied to group users for evaluation. In some technical instances, selection of different data types of user activity data, as input feature data, depends on the type of educational frame of reference designation selected. For instance, categorical representations of student social/emotional feedback from student-specific surveys in one educational class, school, etc., for a specific assignment (or other content) may be more relevant than a comparison of students in different geographical regions and/or age ranges that might be working on different content/assignments. In one example, developers may preset data types of user activity data depending on educational frame of reference designations that are selected, where feature input data may vary dependent on which education frame of reference designation is chosen.

Additionally, or in lieu of applying an educational frame of reference designation, user activity data can be curated according to a temporal frame of reference (e.g., predetermined period of time). A temporal frame of reference is an identified period of time for which to generate a predictive classification pertaining to a user activity level of one or more users (e.g., associated with an educational frame of reference designation). In one example, a temporal frame of reference is one week, where a predictive classification of a user activity level is to be generated for student users associated with an educational class for a given week (e.g., one week period). It is to be recognized that non-limiting examples of temporal frame of reference comprise any period of time including but not limited to: days; weeks; months; and years, among other examples. In technical instances where other types of domain-specific software platforms are being evaluated, specific references as to data types of user activity data and reference designations may be adapted for a specific domain. A temporal frame of reference enables trained AI processing to generate a real-time (or near real-time) classification prediction as to a level of user activity. While an AI model may be trained based on a corpus of training data comprising historical user activity data, it is recognized that an exemplary classification may be generated that predicts student activity for a current or future (e.g., upcoming week). Among other technical benefits, exemplary classifications may provide an early warning notification as to levels of user activity so that other users (e.g., teachers, parents, guardians, other students) can intervene and set a student user up for success in an educational class.

Management (processing operation 212) of input feature data further comprises processing operations to execute feature scaling of input feature data. In one example, feature scaling processing comprises execution of processing operations that normalize input feature data pertaining to exemplary user activity data. In another technical instance, feature scaling processing comprises executing standardization processing operations on the input feature data. Processing operations for execution of feature scaling, including normalization or standardization, are known to one skilled in the field of art. Above what is traditionally, known feature scaling processing is adapted to specifically work with different types of user activity data described herein. For instance, the input feature data based is normalized (or standardized) based on one or more frame of references (e.g., an educational frame of reference designation and/or temporal frame of reference).

In further examples management of input feature data for user activity data comprises processing to remove any bias pertaining to user identification. For instance, user identification for each of a plurality of student users associated with an educational class is identified and scrubbed to remove student user identification from consideration in generating an initial classification of levels of user activity. As such, scrubbing input feature data to remove user identification helps minimize bias when analyzing the user activity data. It is to be understood that user identification can then be reintroduced to generate comprehensive and contextual insights about a user or group of users (e.g., student users of an educational class) including data insights that contemplate historical user activity data for specific users and/or an educational frame of reference designation.

Additionally, feature scaling processing of input feature data further comprises converting values for user activity data (e.g., event count data and/or categorical representations) to numeric representations thereby aiding execution of subsequent dimensionality reduction processing. For instance, normalization (or standardization) processing changes the values of numeric columns in the dataset of the input feature data to a common scale, without distorting differences in the ranges of values. In one example where an educational frame of reference designation is an educational class, values associated with variables/features of input feature data are normalized (or standardized) relative to a class average for the plurality of student users in an educational class across each of the variables/features of input feature data. This ultimately enables an activity score to be generated for each of the plurality of student users, where an individual activity score is generated relative to a class average activity score for all student users of an educational class. As such, results of trained AI processing can evaluate user activity of an individual student user comparatively with other student users of the educational class. In alternative examples, Trained AI processing further executes dimensionality reduction processing (processing operation 214) on normalized (or standardized) input feature data to generate the dimensionality reduction transformation of the user activity data. In one example, execution of the dimensionality reduction processing comprises executing PCA (e.g., via application of a PCA algorithm) on the normalized (or standardized) input feature data to generate one or more principal components for the dimensionality reduction transformation of the user activity data. Once one or more principal components are identified, which are then utilized to generate the dimensionality reduction transformation of user activity data. A dimensionality reduction transformation of user activity is a dataset derived from the input feature data (e.g., user activity data) that is projected onto a lower-dimensional feature subspace. In other words, a dimensionality reduction transformation of the user activity data identifies a low-dimension set of axes to summarize the input feature data, where classification processing can then be applied to generate exemplary classifications of levels of user activity for users. The dimensionality reduction transformed results from projecting input feature data pertaining to user activity data in a PCA space using one or more selected principal components. A result may be a linear representation of the dimensionality reduction transformation, which is projected in the PCA space according to application of the one or more principal components. Data vectors presented in the PCA space are associated with each of the plurality of student users (e.g., of the educational class), where an activity score, representing an aggregate score from a weighted analysis of user activity data, is generated for each of a plurality of users (e.g., student users).

Furthermore, it is important to execute additional processing to understand the direction of the data being view in the PCA space. In one example, trained AI processing of the present disclosure is adapted to apply a null activity vector (zero values for variables/features of user activity data), along with other vectors, to the PCA space to determine frame of reference for evaluating the dimensionality reduction transformation of the user activity data within the PCA space. In other words, the null vector is projected in the PCA space to help figure out the directional representation of data vectors (e.g., activity scores) in the PCA space, where it is determined whether data vectors are projected in the correct direction. Processing operations are then executed to evaluate a sign (positive or negative) associated with data vectors in an updated PCA space that comprises projected data vectors (e.g., student user vectors) and a null activity vector. In technical instances where a sign associated with projected data vectors (e.g., student user vectors) is positive, a confirmation occurs that data is mapped correctly. In technical instances where a sign associated with projected data vectors is negative, additional processing is executed to update a sign associated with a resulting value. For example, a processing operation is executed to flip a negative sign to a positive sign. Updated values may then be re-projected in a PCA space so that the data is viewable in the proper direction.

Flow of method 200 then proceeds to processing operation 216, where a classification as to a level of user activity of users is generated. In an educational example, a classification as to a level of user activity is generated for each of a plurality of student users according to an educational frame of reference designation (e.g., students of an educational class). In doing so, results projected in a PCA space are analyzed to generate labels representative of the classification of the level of user activity for each of the plurality of student users. Exemplary labels are a representation of compression of a plurality of dimensions of user activity data into a binary classification for a user. With respect to labeling, trained AI processing applies a classification algorithm to analyze results of graphing user activity data (e.g., projected in a PCA space). Trained AI processing (e.g., a hybrid machine learning model) generates an activity score for each of the plurality of student users. As indicated in the foregoing an activity score represents an aggregate score from a weighted analysis of user activity data, is generated for each of a plurality of users (e.g., student users). Activity scores for a plurality of users are provided as a linear representation for further analysis. For example, a classification algorithm is applied to evaluate a dimensionality reduction transformation of the user activity data. The classification algorithm executes a supervised analysis (e.g., trained AI model) that generates a label indicating a classification of a level of user activity for a user (e.g., student user). In one example, the classification algorithm generates the classification using a classifier trained as a logistic regression model. In another examples, the classification algorithm generates a classification using a linear regression model. Processing for executing analysis of data using a logistic regression model and/or linear regression model are known to one skilled in the field of art.

Above what is traditionally known, the present disclosure applies a logistic regression model or linear regression model (collectively referenced herein as a "classification model") to specifically analyze exemplary user activity data, where the classification model is further trained using historical user activity data. The purpose of the classification model is to estimate the probabilities of events, including determining a relationship between features and the probabilities of particular outcomes. For instance, an activity score of a user is used to predictively evaluate whether user activity for a specific time frame (e.g., week in an educational class, semester, year) will be high or low. An activity score for an individual user (e.g., student user) is a predictive analytic derived from a weighted analysis of user activity data associated with a specific user. As previously identified, a weighting for specific features/variables is determined through dimensionality reduction processing (e.g., selection of a principal component). When normalized input feature data (e.g., user activity data) is mapped in a PCA space, activity scores for users are projected as data vectors of user activity data.

An exemplary classification model is adapted, through training on evaluation of historical activity data, to generate (processing operation 216) a classification as to a level of user activity of a user based on a comparative evaluation of activity scores for users (e.g., student users associated with an educational frame of reference designation and/or a temporal frame of reference). In one example, a comparative evaluation is a threshold evaluation pertaining to an activity score for each of a plurality of users (e.g., student users). For instance, activity scores of student users may be comparatively evaluated against a median activity score for users associated with the educational frame of reference designation, where a threshold evaluation is used to identify users whose activity scores are within certain threshold values. In one technical instance, a threshold value is set to identify a low activity score relative to the median activity score. In another technical instance, a threshold value is set to identify a high activity score set relative to the median activity score. For example, activity scores in the bottom and top fifteen percent (15%) relative to a median activity score are provided as labeled examples for supervised binary classification, where a real-time (or near real-time) evaluation of activity scores identify activity scores in the bottom and top fifteen percent metrics respectively as low activity and high activity. However, it is to be recognized that developers can set a threshold value, for threshold evaluation, to any desired metric without departing from the spirit of the present disclosure. In some examples, threshold values for classification may be set relative to a frame of reference designation. For instance, an educational frame of reference designation may vary where rules may be set to apply a predetermined threshold (e.g., threshold values) to evaluate activity scores based on the types of educational frame of reference designation selected. That is, threshold values for evaluating an activity scores of users of an educational class may vary from threshold values for evaluating activity scores of users of a school district.

In some alternative examples, threshold evaluations can be set to evaluate activity scores relative to historical activity scores when generating determinations regarding a level of user activity for a plurality of users (e.g., student users of an educational class). For instance, activity scores can be generated for historical period of time and comparatively evaluated with currently generated activity scores. This may provide a unique perspective for evaluating user activity, where user activity can be framed relative to past user activity which is beneficial for generating data insights about user activity. For example, comparative evaluation of activity scores relative to historical activity scores can enable group-specific designations of users associated with an educational frame of reference designation. As assignments and user activity may vary, this type of contextual information may be useful for teachers to understand how users are interacting with application/services and/or processing specific assignment content.

Trained AI processing is further adapted to output the classification of the level of user activity for one or more of the plurality of users (e.g., student users). In one example, classifications of levels of user activity are output to a data insight generation application/service to generate data insights pertaining to exemplary classifications. While it is to be recognized that any results generated from application of trained AI processing may be used to aid training and updating of a trained model, each and every classification regarding levels of user activity may not be necessary for notification purposes. That is why classifications pertaining to one or more users (e.g., student users) may be selected chosen for output. For instance, users that are identified as satisfying one or more thresholds (e.g., for high level or user activity or low level of user activity) are identified for output. As such, one or more classifications (e.g., associated with one or more users) may be selected for output such as those users that are classified as having low levels of user activity and/or high levels of user activity. In some alternative examples, developers may apply rules for selection of classifications for output. For example, a rule may be set to output any classifications that correspond to those who are predicted to have a low level of user activity and/or high level of user activity. In another example, a rule may be set to select N number of classifications for output (e.g., classifications having the N number of highest or lowest activity scores). In yet another example, a rule may be set to output all classifications generated. For example, a data insight may be generated providing a class report of classifications of all student users and/or evaluate students relative to historical classifications.

Flow of method 200 then proceeds to processing operation 218. At processing operation 218, data insights are generated pertaining to a classification of the level of user activity for one or more of the plurality of users (e.g., student users). For example, a data insight generation application/service receives classifications output by trained AI processing and generates data insights pertaining to classification of levels of user activity for users. In another example, trained AI processing is adapted to generate exemplary data insights. As an example, one or more additional AI models is adapted to generate contextually relevant data insights, where different types of contextual data insights can be generated based on a result of evaluation of exemplary classifications.

Processing for generation of data insights and execution of data insight generation applications/services is known to one skilled in the field of art. Above what is traditionally, known data insights are adapted to be generated based on classifications of levels of user activity for one or more of a plurality of users (e.g., student users) with a specific domain (e.g., educational software platform). For example, an exemplary data insight comprises a classification of a level of user activity of users of an education class with respect to usage of applications/services of an educational software platform. Furthermore, additional processing is executed to correlate an exemplary classification with specific users of a software data platform. As previously referenced, user identification is removed in the normalization (or standardization) of the input feature data (e.g., user activity data) to avoid any bias in generation of a classification. Once classifications are output, processing may occur to correlate classifications with specific users. For instance, generated classifications are correlated with student users (e.g., of an educational class) that use an educational software platform. This processing enables rich and contextual data insights to be generated pertaining to specific users. In some alternative examples, user correlation processing is not required to generate data insights. As an example, a data insight may be generated that evaluates student users of an educational class as a whole, where individual classifications may not be required to generate such a data insight.

In further technical instances, data insights are generated from historical user activity data. As previously referenced, user activity data may comprise historical user activity data (e.g., historical classifications of levels of user activity), which can factor into predictive classifications of levels of user activity. It is further to be recognized that exemplary classifications, generated by trained AI processing, can further be comparatively evaluated with historical user activity data (including prior generated classifications) to provide different frames of reference for data insight generation as well as enhance the comprehensiveness of generated data insights. For instance, a data insight may provide contextual information on trends/patterns of user activity by framing a prediction relative to past predictions and/or performance of a user. In even further examples, a data insight may be generated providing a timeline of user activity analysis, such as a timeline of predictions as to levels of user activity (e.g., past, present and future). In alternative examples, accuracy pertaining to classifications of levels of user activity for one or more users can be checked against actual performance across an educational software platform. For instance, a classification of a low level of user activity can be correlated with a students' actual performance relative to a weekly assignment (e.g., did the student turn the assignment in, was it timely, how well did the student do). This type of contextual analysis leads to more comprehensive and meaningful data insights for evaluating student user activity.

In one example, N number of predictive data insights (e.g., highest priority/order) may be generated from a contextual evaluation of exemplary classifications. In additional examples, predictive data insights may be generated that apply a classification as to level of user activity to predict events associated with a specific domain. For instance, say an exemplary classification is being used to further generate a prediction as to whether (or not) a user is predicted to miss a deadline for an assignment. A data insight can be generated that says a student may miss a deadline for an assignment based on a recent evaluation of user activity (e.g., comprising an exemplary classification of a level of user activity for a predetermined period of time) via the collective analysis described in the present disclosure. In further examples, exemplary data insights comprising predictions pertaining to user activity in an application/service (or software data platform) can be derived based on analysis of one or more classifications as to a level of user activity but also based on analysis of group activity between the user and his classmates on similar assignments, among other examples.

In further examples, selection of specific types of data insights to generate may comprise: assigning, based on application of trained AI processing, a confidence scoring to the predictive insights based on a correlation, for each of the one or more data insights, with one or more classifications as to a level of user activity (e.g., current and/or historical classifications of levels of user activity). In such technical instances, the one or more data insights are then generated based on a threshold evaluation of the confidence scoring for each of the one or more data insights. Thresholds for evaluating confidence scoring for generation of data insights may vary according to developer specifications without departing from the spirit of the present disclosure.

In additional examples, generation of the one or more data insights comprises: identifying, from the collective relevance analysis executed by trained AI processing, one or more data correlations that provide rationale supporting predictive data insights (e.g., talking points). For instance, some types of user activity data may be more relevant than others for generating not only classifications of levels of user activity but also generating predictions regarding user interactions with content of an educational software platform including, assignments, exams, progress reports, milestones, and group activity, among other examples.

Talking points as described herein are support/rationale for a data insight that provide insight into why a data insight is generated. In an example where a data insight is generated that provides a classification of a level of user activity of one or more users, talking points may comprise specific data types of user activity data and/or correlations or patterns between different data types, any of which caused a user activity level to be classified as low or high. Talking points are intended to help a user (e.g., educator or parent) frame and discuss a trend/pattern of user activity. For example, if an exemplary classification for a student user is that the user will have low activity for a weekly assignment, talking points can help a teacher understand why the student user is predicted to have low activity for the week or even why a level of activity is lower (or higher) compared to historical classifications pertaining to the student user. As indicated in the foregoing, talking points are includable in predictive data insights and GUI notifications thereof. In one example, a GUI notification of a data insight may provide a first-level representation of a predictive data insight, where additional layers of the GUI notification may reveal additional context regarding a data insight (e.g., talking points). A non-limiting example of rendering of talking points, in a layered representation is shown in the progression from FIGS. 3A-3C. Talking points may be stored for recall either within a generated predictive insight or as an additional data object (or metadata) that can be added to a GUI notification of a data insight.

For instance, processing operation 218 may comprise generating a GUI notification that comprises one or more data insights. This may occur through automated processing by trained AI processing and/or via a data insight generation application/service. In one example, formatting of GUI notifications is predetermined to populate data fields based on the type of notification (e.g., callout, GUI menu, graph, dynamic timeline) being generated. In other examples, a format and layout of a GUI notification may be dynamically generated based on analysis of exemplary classifications as well as the type of data insight being generated. For example, key data points of correlated data may be expressible in various ways, which may be best represented by evaluating the type of correlated data points to represent relative to processing capabilities of applications/services of the educational software platform. In some technical instances, user interactions with GUI notifications of data insights may dictate how and when to present data associated with a data insight. For example, a user action may select a GUI feature of a surfaced GUI notification to reveal additional context (e.g., talking points) regarding data insights. In further examples, GUI notifications are configured to enable users to take immediate action to address findings of a data insight. GUI notifications may comprise links to automatically initiate message notifications, email notifications, and links to additional telemetric data (e.g., graphs, charts, statistics), among other examples.

In some examples, data insights and GUI notifications are dynamically generated during real-time (or near real-time) user operation of an educational software platform. In other examples, data insights and GUI notifications thereof are stored for recall and presented to a user during subsequent access to the educational software platform. For instance, processing operation 218 may comprise storing, on a distributed data storage that is associated with the educational software platform, GUI notifications comprising one or more data insights. A data storage of a file hosting service or a document management storage system is used to store and manage data for any of: a trained AI processing; generated classifications of levels of user activity; generated data insights (and associated data objects); and generated GUI notifications comprising data insights.

Once data insights (and exemplary GUI notifications)) are generated, flow of method 200 proceeds to processing operation 220. At processing operation 220, a generated data insight is then caused to be rendered for presentation on a computing device such as a user computing device referenced herein. As previously referenced, a GUI notification is generated comprising one or more data insights, where the GUI notification may be rendered, for example, for presentation via an endpoint of a host application/service (e.g., of an educational software platform). In some examples, trained AI processing is executed in a distributed manner using resources that are separate from the computing device that is to present a GUI notification through a GUI of a host application/service. In such technical instances, an exemplary notification is then transmitted to the computing device (e.g., user computing device) for rendering. In some alternative examples, exemplary GUI notifications are generated for rendering by a user computing device (e.g., client computing device) that will display a GUI notification. In such technical instances, the notification and/or the contextual data insights are rendered in a GUI (e.g., of a host application/service) that is presented via a computing device (or peripheral display device). An exemplary GUI notification is presented with content presented through a GUI of a host application/service endpoint. Inline, as referenced in the present disclosure, is intended to refer to technical instances where data is embedded as a content portion (data object), among other content portions, that is displayable within a rendering of a host application/service endpoint. Non-limiting examples of content presented inline are illustrated in FIGS. 3A-3C. In further examples, an exemplary GUI notification and/or data insights are propagated to other computing devices for rendering. For instance, a GUI notification comprising a classification of a level of user activity is rendered on another computing device associated with a registered user account.

Flow of method 200 may then proceed to processing operation 222. At processing operation 222, an exemplary GUI notification, comprising one or more data insights, is rendered. As previously indicated, a GUI notification comprising one or more data insights is rendered in a GUI of a host application or service (e.g., associated with an educational software platform). Non-limiting examples of GUI notifications are provided in the processing device views illustrated in FIGS. 3A-3C.

Furthermore, in examples where a GUI notification is rendered in GUI of a host application/service, flow of method 200 may proceed to processing operation 224. At processing 224, presentation of the GUI notification is updated based on user interaction (user action) with an exemplary GUI notification. For instance, a user may select a GUI element or feature from a GUI notification, where the user requests additional contextual information about a data insight or is seeking to execute a follow-up task or action resulting from presentation of a data insight. For example, a user (e.g., teacher, administrator, parent, student) may wish to follow-up with another user with respect to a predictive classification and/or talking points presented as part of a data insights. In further instances, users may provide user feedback regarding the accuracy and relevance of a predictive insight and/or GUI notification, and/or a social/emotional response to a displayed GUI notification.

User feedback may be used to continuously update trained AI processing to improve predictions and generate the most contextually relevant data insights. As such, any user activity, including user feedback received with respect to GUI notifications and/or data insights may be used to update trained AI processing (processing operation 226). For instance, training data and/or a corpus of additional user activity data may be added and further used to improve accuracy and efficiency of one or more trained machine learning models that may execute dimensionality reduction processing, classification processing and/or data insight generation. Method 200 may then return to processing operation 202 to collect additional user activity data for subsequent analysis thereof. As previously indicated, data insights may be continuously generated to frame user activity as a student progresses throughout an educational class, course, etc.

FIGS. 3A-3C illustrate exemplary processing device views associated with user interface examples for an improved user interface that is adapted for management of data insights providing classification of levels of user activity with a system or service, with which aspects of the present disclosure may be practiced. FIGS. 3A-3C provide non-limiting front-end examples of processing described in the foregoing including system diagram 100 (FIG. 1A), process flow 120 (FIG. 1B), and method 200 (FIG. 2) and the accompanying description of computing system 401 (FIG. 4).

FIG. 3A presents processing device view 300, illustrating a GUI of a collaborative communication application/service (e.g., MICROSOFT® TEAMS®) that is configured as part of an educational software platform. Processing device view 300 illustrates the presentation of a plurality of exemplary GUI notifications inline with other content of the collaborative communication application/service. Inline, as referenced in the present disclosure, is intended to refer to technical instances where data is embedded as a content portion (data object), among other content portions, that is displayable within a rendering of a host application/service. Processing operations for generation of exemplary GUI notifications that comprise data insights have been described in the foregoing description.

In the example shown in processing device view 300, a digital engagement GUI menu 302 presents multiple GUI notifications (respectively first GUI notification 304 and second GUI notification 306) pertaining to evaluation of user engagement with digital content that is associated with an educational software platform. The digital engagement menu 302 is designed to provide contextual information pertaining to user engagement with a software data platform. In the example illustrated in processing device view 300, the digital engagement menu 302 is provides GUI notifications 304 and 306 respectively providing data insights pertaining to exemplary classification of levels of user activity with applications/services of an educational software platform along with associated data insights. In the examples shown, GUI notifications 304 and 306 present data insights that evaluate a group of student users (e.g., of an educational class), for example, to provide a teacher with an overview of user activity across the educational class. However, it is to be recognized that exemplary GUI notifications can provide data insights specific to individual users.

As an example, a first GUI notification 304 provides data insights pertaining to a group classification of student activity for an educational class for a current week (e.g., temporal frame of reference). An exemplary classification can be an actual evaluation of user activity data over a temporal frame of reference (e.g., user activity over a complete week) or a prediction providing a predicted level of user activity (e.g., based on analysis of current and/or past user activity data). From contextual analysis of user activity data (e.g., by the trained AI processing) the first GUI notification 304 identifies that a class of students is determined (or predicted) to be less active during the current week. This is an example of a binary classification where a group of users is predicted to have a low level of user activity for a temporal frame of reference.

Additionally, the first GUI notification 304 provides additional data insight in the form of an exemplary talking point (rationale) indicating how much student user activity decreased (or is predicted to decrease) over the current week. This stems from a result of execution of trained AI processing that analyzes input feature data pertaining to user activity data. Additional GUI elements or features are presented that enable users (e.g., teachers or students) to dive into these data insights further including "tracking of student activity", which may enable users to see individual classifications of levels of user activity, which may contribute to the group/class classification indicating that user activity is (or is likely to be) lower during the current week.

Similarly, the digital engagement menu 302 provides a second GUI notification 306 that provides predictive data insights pertaining to a group classification of student activity for an educational class for a future point in time (e.g., next week). From contextual analysis of user activity data (e.g., by the trained AI processing) the second GUI notification 306 identifies that a class of students is determined (or predicted) to be more active in the following week, for example, as compared to the current week. This is an example of a binary classification where a group of users is predicted to have a high level of user activity for a temporal frame of reference.

Additionally, the second GUI notification 306 provides additional data insight in the form of an exemplary talking point (rationale) as to how much that student user activity is predicted to increase. This also stems from a result of execution of trained AI processing that analyzes input feature data pertaining to user activity data. Similar to GUI elements/features presented in the first GUI notification 304, GUI elements/features are presented that enable users (e.g., teachers or students) to dive into these data insights further including "tracking of student activity" pertaining to a class of student users.

A third GUI notification 308 provides another example of a data insight, this time pertaining to a classification of a level of user activity for a specific student user ("Shay Daniel"). Similar to the previously described GUI notifications, a data insight included in the third GUI notification 308 is a data insight pertaining to a classification of a level of user activity of the student user "Shay Daniel" over a temporal frame of reference (e.g., current week). Furthermore, the exemplary classification is associated with a specific assignment assigned to the student user via the educational software platform. Furthermore, the third GUI notification 308 correlates the classification of a low level of user activity for the week in a specific application/service with a predictive data insight that indicates that the student user will likely miss an assignment deadline for an assignment (e.g., "Book Report Review"). For example, the student user may have to complete the assignment using a specific host application/service, where it is determined that the student user has or has had a lower level of activity within this specific host application/service.

Continuing the example shown in the third GUI notification 308, a user (e.g., teacher), viewing a GUI representation of a collaborative communication application/service, executes a user action 312 selecting a GUI feature 310 associated with the third GUI notification 308. The GUI feature 310 is question ("WHY") prompting the user to select the GUI feature 310 to obtain additional information. User action 312 is a trigger for display of processing device view 320 (FIG. 3B) subsequently described.

FIG. 3B presents processing device view 320, illustrating a continued example of processing from that shown in processing device view 300 (FIG. 3A). As previously referenced, processing device view 320 is presented as a result of receipt of user action 312 (FIG. 3A) selecting a GUI feature to obtain additional contextual information about a data insight shown in the third GUI notification 308 (FIG. 3A). In response to receipt of user action 312, an automatic data insight notification 322 is automatically rendered and presented for the user. Automatic data insight notification 322 provides additional data insights as talking points relative to the presentation of the third GUI notification 308.

For instance, a first data insight 324 is presented in automatic data insight notification 322 providing a data analytic indicating that the student user ("Shay Daniel") was twenty (20) percent more active in the host application/service at the same point of reference relative to an assignment due date for a prior assignment (e.g., during week 1). Additionally, the automatic data insight notification 322 further provides a second data insight 326 indicating that the class average activity score for the educational class ("English 101" is fifteen (15) percent higher than the user activity rate of the student user "Shay Daniel". This type of metric may coincide with a threshold evaluation of a student users' activity score relative to those of other student users in the same class (e.g., an education frame of reference designation). Moreover, a third data insight 328 provides a data insight associated with a specific data type of user activity data. Third data insight 328 identifies that the student user "Shay Daniel" responded negatively to a weekly emotional survey provided to student users via an educational software platform. This may be an example of a data type of user activity data that was analyzed to generate a classification as to a level of user activity for the student user. As an example, developers may tag/identify specific data types of user activity data that they consider useful to generate contextually relevant data insights. In this example, the student user negatively responding to the weekly emotional survey for a specific assignment may have a direct correlation to the level of user activity that is detected. This type of data insight may serve as an early warning notification for a teacher to intervene and assist the student user.

Additionally, the automatic insight notification 322, presented in processing device view 320, further comprises a GUI element 330 that is configured to enable a user (e.g., teacher) to dive deeper into this predictive data insight. For instance, GUI element 330 is presented as a suggestive link (selectable link represented as ("See More"), which is selectable to enable a user to get more information about the predictive data insights. Processing device view 320 shows a user action 332 selecting the GUI element 330. User action 332 is a trigger for display of processing device view 340 (FIG. 3C) subsequently described.

FIG. 3C presents processing device view 340, illustrating a continued example of processing from that shown in processing device view 320 (FIG. 3B). As previously referenced, processing device view 340 is presented based on receipt of user action 332 (FIG. 3B) selecting a GUI feature 330 to obtain additional contextual information about predictive data insights, specifically a data insight pertaining to the student users' responds to weekly emotional survey. An additional data insight notification 342 is automatically rendered and presented for the user. The additional data insight notification 342 provides additional data insights as talking points relative to the presentation of the third data insight 328 (FIG. 3B).

In the example shown in processing device view 340, a first follow-up data insight 344 is presented indicating that the student user "Shay Daniel" provided a confused emoji in response to a question pertaining to assignment guidelines. The first follow-up data insight 344 provides a clear talking point to identify that the user may be having difficulty with the assignment.

A second follow-up data insight 346 is also provided that identifies other student users' (e.g., "Yossi Amnon") who also provided a confused emoji in response to a question pertaining to assignment guidelines. The second follow-up data insight 346 provides a talking point as an early warning notification identifying other student users who may similarly be struggling with an assignment. Additionally, to further aid processing efficiency, a GUI feature 348 is provided in the additional data insight notification 342 that enables the teacher to automatically initiate a communication with the other identified student user (e.g., "Yossi Amnon") who may also need to help to complete the current assignment.

FIG. 4 illustrates a computing system 401 suitable for implementing processing operations described herein related to generation and management of classifications of levels of user activity, with which aspects of the present disclosure may be practiced. As referenced above, computing system 401 may be configured to implement processing operations of any component described herein including exemplary components previously described in system diagram 100 (FIG. 1). As such, computing system 401 may be configured to execute specific processing operations to solve the technical problems described herein, which comprise processing operations for intelligent and efficient generation of classification of user activity levels pertaining to usage of a system (e.g., software data platform) or specific application/service. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406A-B) that are configured to enable functionality described herein. In some examples, computing system 401 may be connected to other computing devices (e.g., display device, audio devices, servers, mobile/remote devices, gaming devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1A), process flow 120 (FIG. 1B), processing operations described in method 200 (FIG. 2) and/or the accompanying description of FIGS. 3A-3C.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing an activity classification component 406a; and application/service components 406b, as described herein. In further examples, software may comprise program instructions for executing a separate component for implementation of a programmed software module and/or trained AI processing though in other instances a programmed software module and/or trained AI processing may be executed by one of the other components of system diagram 100 in combination with one or more computing systems 401.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: results from application of trained AI processing including generated classifications of levels of activity of users relative to a software data platform and/or specific application/service; management over trained AI processing including building, training and adapting trained AI models to execute processing operations described herein including GUI views for management of exemplary user activity data, code for execution of dimensionality reduction processing and classification processing, thresholds for classification determinations, and user feedback; management of log data, user activity data and telemetry data; an improved GUI providing data insights pertaining to classification determinations, user recommendations, and management of user interactions; enabling user interactions with GUI elements and features including presentation of GUI menus and callouts, application command control, etc. and providing notifications through different host application/service endpoints (e.g., via GUI elements, OS notifications and/or inline with content), among other examples. User interface system 409 comprises a graphical user interface that presents graphical user interface elements representative of any point in the processing described in the foregoing description including processing operations described in system diagram 100 (FIG. 1A), process flow 120 (FIG. 1B), processing operations described in method 200 (FIG. 2) and/or the accompanying description of FIGS. 3A-3C.

A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output, handwritten input, AR/VR input) in conjunction with operation of exemplary applications/services described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method to help guide learning by a plurality of student users comprising:
   by one or more computer devices connected to a network:
   storing user activity data of an educational software platform in one or more data storage devices connected to the network, wherein the user activity data comprises event count data indicating user activity, by each student user of the plurality of student users, with each of a plurality of applications of the educational software platform;
   accessing, via the network, the user activity data on the one or more data storage devices;
   executing one or more trained artificial intelligence (AI) models within a computing environment connected to the network to generate a classification of a level of user activity for each student user of the plurality of student users based on analysis of a dimensionality reduction transformation of the user activity data, wherein the one or more trained AI models, in generating the classification of user activity for each student user of the plurality of student users, executes processing operations that comprise:
      identifying input feature data for the one or more trained AI models, wherein the input feature data comprises features indicating the event count data for each of the plurality of student users;
      normalizing the input feature data based on an educational frame of reference designation to create normalized input feature data;
      executing dimensionality reduction processing on the normalized input feature data to generate the dimensionality reduction transformation of the user activity data, wherein executing the dimensionality reduction processing comprises executing principal component analysis (PCA) on the normalized input feature data to generate one or more principal components and projecting the normalized input feature data in a PCA space based on the one or more principal components;
      applying a null activity vector to the dimensionality reduction transformation of the user activity data in the PCA space to determine a frame of reference for evaluating a projection of the normalized input feature data in the PCA space; and
      generating the classification of the level of user activity for each student user of the plurality of student users based on analysis of the dimensionality reduction transformation of the user activity data;
   generating at least one data insight for visual presentation in a graphical user interface (GUI) of an application of the educational software platform, wherein the data insight indicates a comparative level of user activity in the educational software platform by at least one student user of the plurality of student users during a current temporal frame of reference as compared to a previous temporal frame of reference; and
   causing the at least one data insight to be displayed in the GUI of the application of the educational software platform.

2. The computer-implemented method of claim 1, wherein the plurality of student users are students in an educational class, and wherein the educational frame of reference designation is the educational class.

3. The computer-implemented method of claim 2, wherein the one or more trained AI models generate an activity score for each student user of the plurality of student users based on an application of a classification algorithm to the dimensionality reduction transformation of the user activity data, and wherein the classification of the level of user activity for each student user of the plurality of student users is generated based on an analysis of a comparative evaluation of activity scores for the plurality of student users.

4. The computer-implemented method of claim 3, wherein the comparative evaluation comprises:
   executing a threshold evaluation of the activity score, for each of the plurality of student users;
   classifying one or more of the plurality of student users as low activity based on a result of the threshold evaluation; and
   classifying one or more of the plurality of student users as high activity based on a result of the threshold evaluation.

5. The computer-implemented method of claim 3, wherein the classification algorithm generates the classification using a classifier trained as a logistic regression model.

6. The computer-implemented method of claim 3, wherein the one or more trained AI processing models are further adapted to generate labels for the classification of the level of user activity for each student user of the plurality of student users based on analysis of the projection in the PCA space using a trained machine learning model.

7. The computer-implemented method of claim 1, further comprising, prior to generating the at least one data insight, determining a change in the level of user activity in the educational software platform based on the classification of the level of user activity for each student user of the plurality of student users.

8. The computer-implemented method of claim 1, wherein generating the classification of the level of user activity for each student user of the plurality of student users comprises applying a classification algorithm to generate the classification from analysis of the projection of the normalized input feature data according to the dimensionality reduction transformation of the user activity data.

9. The computer-implemented method of claim 1, wherein the user activity data further comprises categorical representations of user feedback received from student surveys that are provided through the educational software platform, wherein the normalizing of the input feature data further comprises converting the categorical representations of user feedback to numerical representations.

10. A system comprising:
   at least one processor; and
   a memory, operatively connected with the at least one processor, storing computer-executable instructions to help guide learning by a plurality of student users, wherein the executable instructions, when executed by the at least one processor, causes the at least one processor to execute a method that comprises:
      storing user activity data of an educational software platform in one or more data storage devices connected to a network, wherein the user activity data comprises event count data indicating user activity, by each student user of the plurality of student users, with each of a plurality of applications of the educational software platform;
      accessing, via the network, the user activity data on the one or more data storage devices;
      executing one or more trained artificial intelligence (AI) models within a computing environment connected to the network to generate a classification of a level of user activity for each student user of the plurality of student users based on analysis of a dimensionality reduction transformation of the user activity data, wherein the one or more trained AI models, in generating the classification of user activity for each student user of the plurality of student users, executes processing operations that comprise:
         identifying input feature data for the one or more trained AI models, wherein the input feature data comprises features indicating the event count data for each of the plurality of student users;
         normalizing the input feature data based on an educational frame of reference designation to create normalized input feature data;
         executing dimensionality reduction processing on the normalized input feature data to generate the dimensionality reduction transformation of the user activity data, wherein executing the dimensionality reduction processing comprises executing principal component analysis (PCA) on the normalized input feature data to generate one or more principal components and projecting the normalized input feature data in a PCA space based on the one or more principal components;
         applying a null activity vector to the dimensionality reduction transformation of the user activity in the PCA space to determine a frame of reference for evaluating a projection of the normalized input feature data in the PCA space; and
         generating the classification of the level of user activity for each student user of the plurality of student users based on analysis of the dimensionality reduction transformation of the user activity data;
      generating at least one data insight for visual presentation in a graphical user interface (GUI) of an application of the educational software platform, wherein the data insight indicates, a comparative level of user activity in the educational software platform by at least one student user of the plurality of student users during a current temporal frame of reference as compared to a previous temporal frame of reference; and
      causing the at least one data insight to be displayed in the GUI of the application of the educational software platform.

11. The system of claim 10, wherein the plurality of student users are students in an educational class, and wherein the educational frame of reference designation is the educational class.

12. The system of claim 11, wherein the one or more trained AI models generate an activity score for each student user of the plurality of student users based on an application of a classification algorithm to the dimensionality reduction transformation of the user activity data, and wherein the classification of the level of user activity for each student user of the plurality of student users is generated based on an analysis of a threshold evaluation of activity scores for the plurality of student users.

13. The system of claim 12, wherein the threshold evaluation comprises: classifying, from analysis of the activity scores for the plurality of student users relative to one or more set thresholds, one or more student users of the plurality of student users as low activity and one or more student users of the plurality of student users as high activity.

14. The system of claim 13, wherein the method, executed by the at least one processor, further comprises, prior to generating the at least one data insight, determining a change in the level of user activity in the educational software platform based on the classification of the level of user activity for each student user of the plurality of student users.

15. The system of claim 10, wherein the user activity data further comprises categorical representations of user feedback received from student surveys that are provided through the educational software platform, and wherein the normalizing of the input feature data further comprises converting the categorical representations of user feedback to numerical representations.

16. One or more non-transitory computer-readable storage media having program instructions stored thereon to help guide learning by a plurality of student users, wherein the program instructions, when executed by a computing system, direct the computing system to perform operations, the operations comprising:

by one or more devices connected to a network:
storing user activity data of an educational software platform in one or more data storage devices connected to the network, wherein the user activity data comprises event count data indicating user activity, by each student user of the plurality of student users, with each of a plurality of applications of the educational software platform;
accessing, via the network, the user activity data on the one or more data storage devices;
executing one or more trained artificial intelligence (AI) models within a computing environment connected to the network to generate a classification of a level of user activity for each student user of the plurality of student users based on analysis of a dimensionality reduction transformation of the user activity data, wherein the one or more trained AI models, in generating the classification of user activity for each student user of the plurality of student users, executes processing operations that comprise:
identifying input feature data for the one or more trained AI models, wherein the input feature data comprises features indicating the event count data for each of the plurality of student users;
normalizing the input feature data based on an educational frame of reference designation to create normalized input feature data;
executing dimensionality reduction processing on the normalized input feature data to generate the dimensionality reduction transformation of the user activity data, wherein executing the dimensionality reduction processing comprises executing principal component analysis (PCA) on the normalized input feature data to generate one or more principal components and projecting the normalized input feature data in a PCA space based on the one or more principal components;
applying a null activity vector to the dimensionality reduction transformation of the user activity data in the PCA space to determine a frame of reference for evaluating a projection of the normalized input feature data in the PCA space;
generating the classification of the level of user activity for each student user of the plurality of student users based on analysis of the dimensionality reduction transformation of the user activity data; and
outputting the classification of the level of user activity for one or more student users of the plurality of student users; and
generating at least one data insight for visual presentation in a graphical user interface (GUI) of an application of the educational software platform, wherein the data insight indicates a comparative level of user activity in the educational software platform by at least one student user of the plurality of student users during a current temporal frame of reference as compared to a previous temporal frame of reference; and
causing the at least one data insight to be displayed in the GUI of the application of the education software platform.

17. The one or more non-transitory computer-readable storage media of claim 16, wherein the one or more trained AI models generate an activity score for each student user of the plurality of student users based on an application of a classification algorithm to the dimensionality reduction transformation of the user activity data, and wherein the classification of the level of user activity for each student user of the plurality of student users is generated based on an analysis of a threshold evaluation of activity scores for the plurality of student users.

18. The one or more non-transitory computer-readable storage media of claim 16, the operations further comprising, prior to generating the at least one comparative data insight, determining the number of student users of the plurality of student users that are less active during the current temporal frame of reference than during the previous temporal frame of reference.

* * * * *